United States Patent [19]

Johnson et al.

[11] Patent Number: 4,924,845
[45] Date of Patent: May 15, 1990

[54] COOKER AND METHODS OF COOKING

[75] Inventors: Russell L. Johnson, Waupaca County; Frederick J. Hrubecky; James E. Fay, III, both of Winnebago County, Wis.

[73] Assignee: Kimberly-Clark Corporation, Neenah, Wis.

[21] Appl. No.: 37,914

[22] Filed: Apr. 13, 1987

[51] Int. Cl.⁵ .............................................. A47J 37/00
[52] U.S. Cl. ................... 126/25 R; 126/9 R
[58] Field of Search ............... D7/332, 334, 335, 336, D7/339, 347; 126/25 R, 25 A, 25 AA, 26, 29, 30, 9 R, 9 B, 92 B, 44, 92 R, 92 AC, 92 C; 248/213.2; 99/450

[56] References Cited

U.S. PATENT DOCUMENTS

| | | | |
|---|---|---|---|
| Re. 26,123 | 12/1966 | Davis | 126/9 R |
| 269,839 | 7/1983 | Givens III | D7/4 |
| 3,049,071 | 8/1962 | Diack | 126/9 R |
| 3,279,452 | 10/1966 | Hottenroth et al. | 126/25 |
| 3,330,266 | 7/1967 | Stephen | D7/334 |
| 3,611,915 | 10/1971 | Glaser et al. | 126/25 R |
| 3,915,145 | 10/1975 | Tomita | 126/25 |
| 3,933,146 | 1/1976 | Hasting | 126/44 |
| 4,281,633 | 8/1981 | Wackerman | 126/25 |
| 4,436,081 | 3/1984 | Hefling | 126/25 A X |
| 4,463,746 | 8/1984 | Knuth et al. | 126/25 R |
| 4,467,709 | 8/1984 | Anstedt | 99/482 |
| 4,576,140 | 3/1986 | Schlosser | 126/25 |
| 4,587,948 | 5/1986 | Haglund | 126/25 R |
| 4,667,651 | 5/1987 | Groeneweg | 126/25 A |
| 4,777,927 | 10/1988 | Stephen et al. | 126/25 R |

Primary Examiner—Noah P. Kamen

[57] ABSTRACT

Cookers, methods of cooking and igniting fuel, and packaged fuel. Novel features of the cookers include receptacles and covers having reflective inner surfaces in the shapes of paraboloids. Another novel feature is a novel cooking surface and support which may extend above the top of the receptacle and into the cover. A supporting and stabilizing pan is attached to the receptacle and biased from the receptacle by a biasing means. The biasing means, combustion grate, and cooking surface support are, in combination, resiliently deformable such that the biasing means and combustion grate can be assembled to the cooking surface for storage or transport. The cookers can be readily disassembled from the cooking mode and reassembled for storage with a reduction in volume of up to at least about 50%, all without use of tools. A cap on the cooker serves dual functions of protecting the top of the cover when installed on the cover and of holding and optionally measuring lighter fluid, as in a cup, in application of lighter fluid to solid fuel. A packaged fuel article includes a container having the holding, and optionally, the measuring attributes of the cap. Method of cooking includes using a single solid fuel article as the source of heat. Also included is method of igniting charcoal, wherein the lighter fluid is measured and applied in a container.

142 Claims, 8 Drawing Sheets

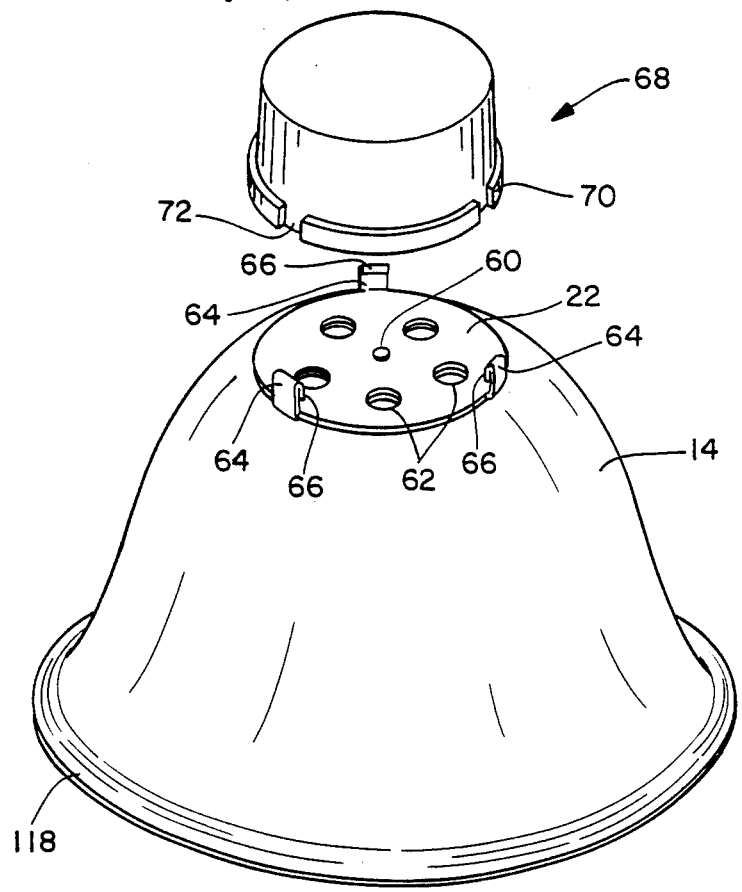
FIG. 8
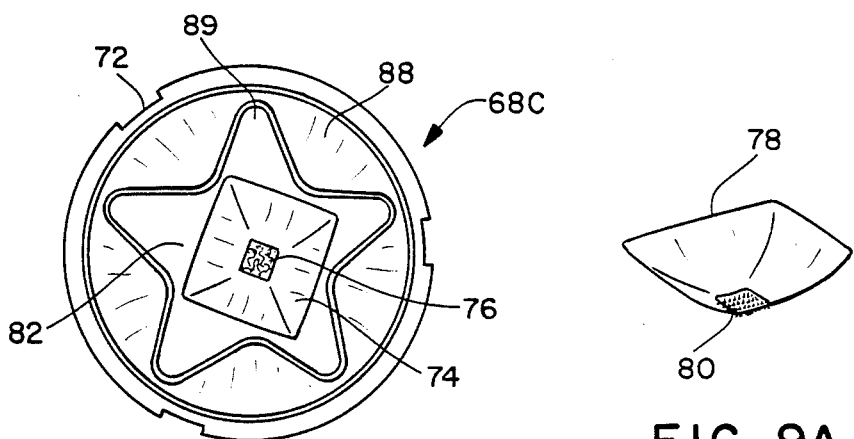
FIG. 9
FIG. 9A

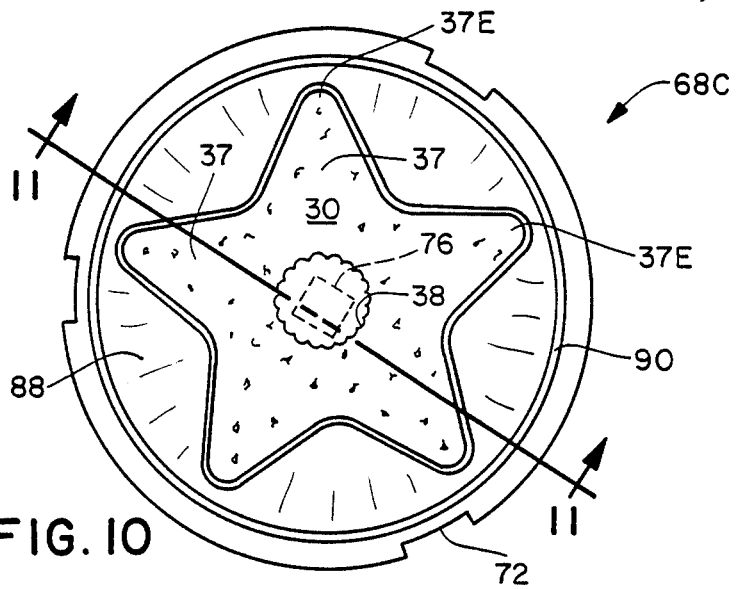
FIG.10
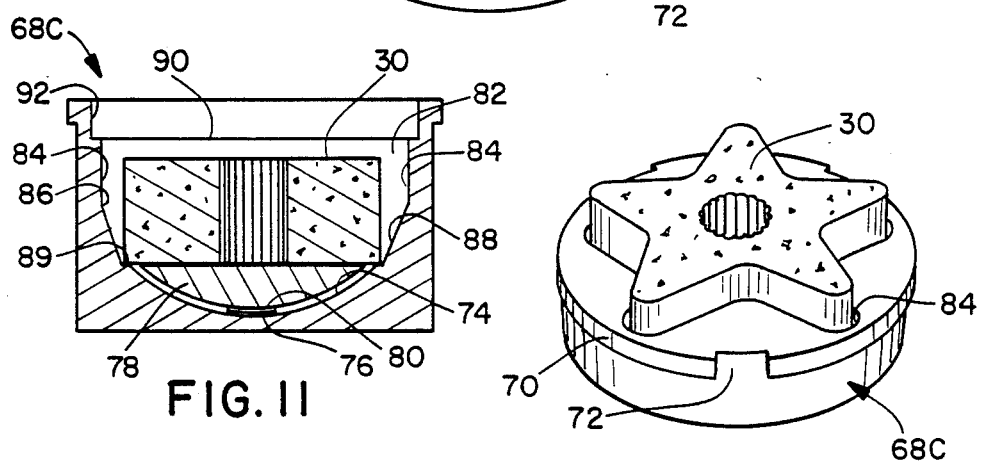
FIG.11
FIG.12
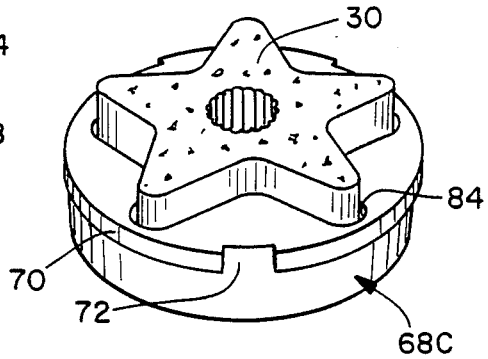
FIG.11A
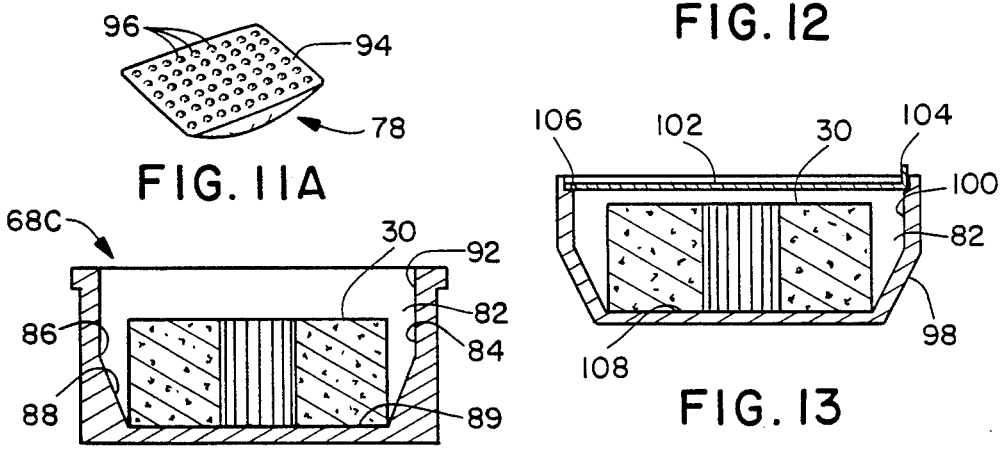
FIG.11B
FIG.13

COOKER AND METHODS OF COOKING

BACKGROUND OF THE INVENTION

This invention relates to cookers, typical of which are solid fuel cookers, such as those used in the cooking of food with charcoal. A variety of charcoal type cookers are conventionally available, and serve the functions of containing the fuel and generating the heat used for the cooking process. Conventional cookers, when referred to herein, unless otherwise specified, refers to 56 cm. diameter cookers as produced by Weber-Stephen Products Company, Palatine, Illinois. These types of cookers have enjoyed substantial success and acceptance. They do, however, have a number of difficulties. One particular difficulty which is addressed in the invention herein is that typical cookers are relatively large, such as 56 centimeters in diameter, and equally as tall, or more. Some such cookers are provided with support means such as legs which, in addition to raising the cooker, raises its center of gravity and, thereby, reduces stability. Particularly with the larger cookers, their size makes them difficult to move. The larger cookers are typically provided with wheels with which they may be moved from place to place. While wheels facilitate movement, they tend to further reduce stability. Instability, of course, introduces a substantial hazard to accidental spills and associated burnings during use of the cooker. In any event, the cookers which are presently available tend to be somewhat less stable than is desirable, and are not readily disassembled and reconfigured into a smaller size assembly for storage or transport.

It is an object of this invention to provide novel cookers and cooker components which provide improved ease of use of the cooker, and greater adaptability of the cooker for storage and transport.

It is another object of the invention to provide cookers having a greater variety of sizes, and particularly smaller sizes which are functional for cooking smaller amounts of food—and which may be further reduced in size, such as by about 50% in volume, for storage or transport, all being improvements in convenience of use of the cookers.

Yet other objects are represented in making cookers which have desirable characteristics regarding stability, safety, and efficiency.

SUMMARY OF THE INVENTION

Some embodiments of the invention are seen in a cooker having a lower receptacle member, and an upper cover member. The shape of the inner surface of the upper cover is that of a paraboloid. The purpose of the paraboloid is for reflecting radiant energy. It is preferred that the inner surface of the upper cover focus both radiant energy and convective heat about the focal locus of the paraboloid.

It is preferred in the cookers of the invention that the inner surface of the lower receptacle also comprise a paraboloid.

It is desirable, though not necessary, that the two paraboloids be congruent.

It is also desirable that both paraboloids have a common axis when assembled in the cooking configuration but, similarly, the common axis is not required.

One attribute of the preferred embodiments of the invention is that the cooker be functional to generate a centralized convective heat transfer column which travels vertically through the cooker from the bottom of the cooker to the top. One result of this centralized convective heat transfer column is that air movement adjacent the inside surface of the outer walls of the cooker is reduced as compared to a conventional cooker. This reduction in movement of air adjacent the inner surfaces of the cooker wall results in less convective heat being delivered to the walls.

The heat source for cookers of this invention may be any of the conventional heat sources, such as charcoal, wood and the like, and including a gas burner, such as liquid propane gas. Additional heat sources may be those which are available from small size solid fuel articles. Lumps of solid fuel are preferred. Preferred heat source for use with those cookers of the invention which are of a smaller size is a single lump article fuel source, such as a single charcoal briquette acting much like a point source of heat.

The cookers of the invention may have a plurality of internal support members including a combustion grate, a cooking surface and a cooking surface support. It is preferred that the internal support members have only limited contact with the receptacle and cover in order to reduce conductive heat transfer to the cover and the receptacle, which cover and receptacle usually form the outer surface of the cooker enclosure. The limited contact between internal support members and the outer surface is generally comprised of point contact, and is usually limited to places where that contact is desirable for stability or for support. Reduction in combined conductive and convective heat transfer results in somewhat cooler outer wall portions of the cooker, as compared to a conventional cooker.

The cooker provides indexing means for positioning the cover in proper location over the receptacle. Preferably, the indexing means is incorporated into the cooking surface support.

Preferred embodiments of the invention provide means for concentrating the flow of air and combustion products in an upwardly flowing combustion column. This is accomplished by having a primary air inlet passage vertically below the combustion grate with a direct path for unimpeded vertical flow of air between the primary air inlet and the grate. Secondary air inlet passages may surround the primary air inlet passage. One or more air outlet passages in the cover are aligned with the combustion grate and assist in directing the flow of the upward column.

In addition to the internal support members, the preferred embodiments of the cooker also include a biasing spacing ring, a support pan, and a cap.

The cooker of the invention may be disassembled from the cooking configuration without the use of tools into a plurality of primary components. The cover and the receptacle may be stored, one nested inside the other. The cooker may be assembled as a closed unit of reduced volume for shipping, transportation, or storage. In the storage configuration the cooker is preferred to be an essentially closed unit. All components of the cooker are held inside the enclosed unit thus reducing the volume by up to at least about 50%. In the storage configuration, and with the receptacle and cover nesting, the nest has a large opening and, optionally, one or more smaller openings opposing the large opening. The pan may be secured as a closure over the large opening. The small openings, which may serve as air outlet passages, may be secured closed by means of a normal vent type closure, and may be further covered by a cap, which serves additional functions as discussed hereinafter. In the storage configuration, the biasing ring and the combustion grate are stored by assembling them to the cooking surface. Joining means on the pan, the cover, and/or the receptacle, separably join the pan, the cover, and the receptacle together to form, in general, the basic closure members of the closed cooker in its storage configuration.

The cooking surface and support are supported from the receptacle, and preferably are separably attached to the receptacle. It is preferred that there be a spacing between the cooking surface and the receptacle of at least 6% of the width across the top of the receptacle. This spacing provides convenient access to the fuel for manipulation of the fuel during the ignition and cooking processes.

In preferred embodiments, the cooking surface is above the top of the receptacle, and it is preferred that it extend into the volume defined by the cover. In its most preferred embodiment, the cooking surface is resiliently deformable to hold other components of the cooker, and particularly the combustion grate and the spacing ring, as for assembly thereto for storage or transportation.

In some cases, the cooking surface may be more rigid, and the elements to be assembled to the cooking surface are more deformable, such that they may deform in the assembly process. In other embodiments, the cooking surface and the elements to be assembled to it may be mutually deformable.

The cooking surface is preferably assembled to its support by deformation, of either the cooking surface or the support, or both. The cooking surface support assembles to the receptacle by deformation of either the receptacle or the support, or both. In any event, it is highly preferred that the cooking surface, as well as any support for the cooking surface, be assembled into the cooker, and particularly to the receptacle in such a manner that it cannot be removed by gravity when the cooker is tipped; and yet can be readily disassembled from the cooker without the use of tools.

The receptacle, which is typically in the shape of a paraboloid, with the larger portion of the paraboloid being pointed upwardly, is preferably supported by an underlying pan. The pan is attached to the receptacle and provides general support between an underlying surface such as a floor or a table, and the cooker. The pan is typically of a round shape, and a central portion of the pan is attached to the lower portion of the receptacle. The pan generally has substantial lateral dimensions which provide overall stability to the cooker through its central attachment to the receptacle. The central attachment is of a separable nature, such that the pan can be separated from the receptacle without the use of tools. The pan preferably has a peripheral upstanding flange. The top surface of the flange defines a plane positioned vertically above the primary air inlet hole.

In the assembled configuration, air may flow unimpeded to the primary air inlet in the receptacle which is preferably located adjacent, or contiguous with, the attachment of the pan to the receptacle. In preferred embodiments, the pan contacts its underlying support at locations spaced from the central attachment between the pan and the receptacle. This spaced contact, in combination with the substantial lateral dimensions of the pan, provides substantial and excellent stability to the preferred embodiments of the cooker.

The biasing spacing ring referred to hereinabove circumscribes the central attachment of the pan to the receptacle, and holds the pan and the receptacle spaced from each other by means of a biasing force. This biasing force provides an upward displacement in the central portion of the pan, which results in the pan having the above iterated contact with its underlying support at locations spaced from the central attachment location.

The cookers of the invention further may include a cap which has two general purposes. One purpose of the cap is to cover and protect the one or more air outlet passages when the cooker is in the storage configuration. A second, and substantial, purpose of the cap is to serve as a cup, for use in applying lighter fluid to a fuel article. Thus the cap has an interior configuration in the shape of a cup. The interior of the cup generally comprises a cavity which is configured for receiving a specific shape of fuel article. The cavity is, in general, larger in cross-section at its top than the fuel article with which it is intended to be used, and is conformed to the shape of the fuel article at the bottom of the cavity. One surface of the cavity, generally the bottom, conforms to the shape of one surface, generally the bottom, of the fuel article. One surface of the cavity may further have a depression in it conforming to a surface of a second shape of fuel article. The cross-sectional area of the cavity is preferably smaller in the lower portion of the cavity than in the upper portion. The sidewalls may be tapered inwardly. This inward taper is functional for guiding the fuel article to the bottom of the cavity when the fuel article is placed in it. The walls are also preferred to be functional for guiding lighter fluid which is placed in the cavity to a fuel article in the cavity. It is preferred that the cup include a volume indicator to indicate the appropriate volume of lighter fluid to be added to the cavity for application to the fuel article in the cavity.

In one preferred embodiment, the volume of the cavity is such that, with the fuel article in the cavity, the appropriate amount of lighter fluid when added to the cavity brings the level of the lighter fluid to the top of the fuel article.

The invention further contemplates a packaged product including a fuel article and a package generally conforming to that fuel article and having a spacing between the fuel article and at least one wall. The purpose of the spacing is to retain lighter fluid which may be added to the package, after the package is opened, whereby lighter fluid is applied to the fuel article in the package container.

The invention further contemplates a method of cooking. In the method, a single fuel article is selected as the source of heat. The fuel article is treated with lighter fluid as appropriate, and placed on a combustion grate in a receptacle of a cooker and ignited. Air inlet passage is provided in the receptacle below the fuel article. An air outlet passage is provided above the fuel article, in the cover. The combustion grate is aligned with the inlet and the outlet and food is put on the cooking surface between the inlet and the outlet. In preferred embodiments of the cooking method, the fuel article is provided with a central vertical hole passing through it.

In another family of embodiments, the invention contemplates methods of igniting charcoal. The methods comprise placing a predetermined quantity of charcoal in a lighter fluid application container, applying an appropriate amount of lighter fluid as indicated by the container or the combination of the container and the fuel article, effecting absorption of the lighter fluid, and igniting the charcoal/lighter fluid combination.

BRIEF DESCRIPTION OF THE DRAWINGS

FIGS. 8, 9, 9A, 10, 11, 11A, 11B, and 12 show the cooker cap and its functional uses as a cup for applying lighter fluid to solid fuels.

FIG. 13 shows a package of fuel adapted for use with cookers of this invention.

DETAILED DESCRIPTION OF THE ILLUSTRATED EMBODIMENTS

Figure 1:
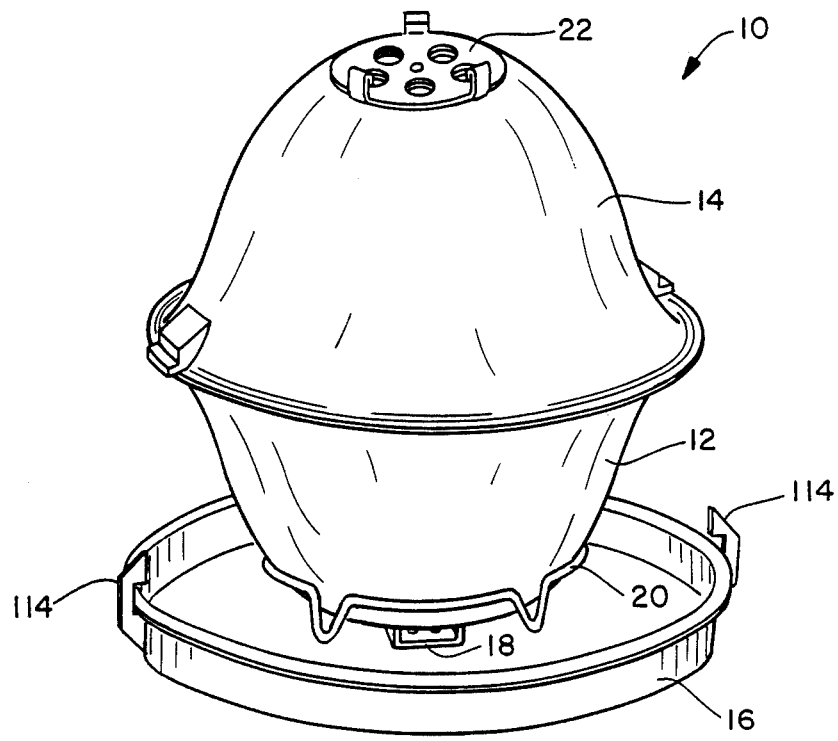
FIG. 1 is a pictorial view of a cooker of this invention assembled in the cooking configuration.

The invention is seen in general in a cooker 10 shown in FIG. 1 in pictorial view. The cooker 10 has a lower receptacle member 12 and an upper cover member 14. The receptacle 12 is attached to a supporting and stabilizing pan 16 by latch means 18. Biasing ring 20 provides a biasing force tending to urge receptacle 12 away from pan 16. Vent 22 is attached to cover 14 for the escape of gases from the cooker.

Figures 2, 2A:
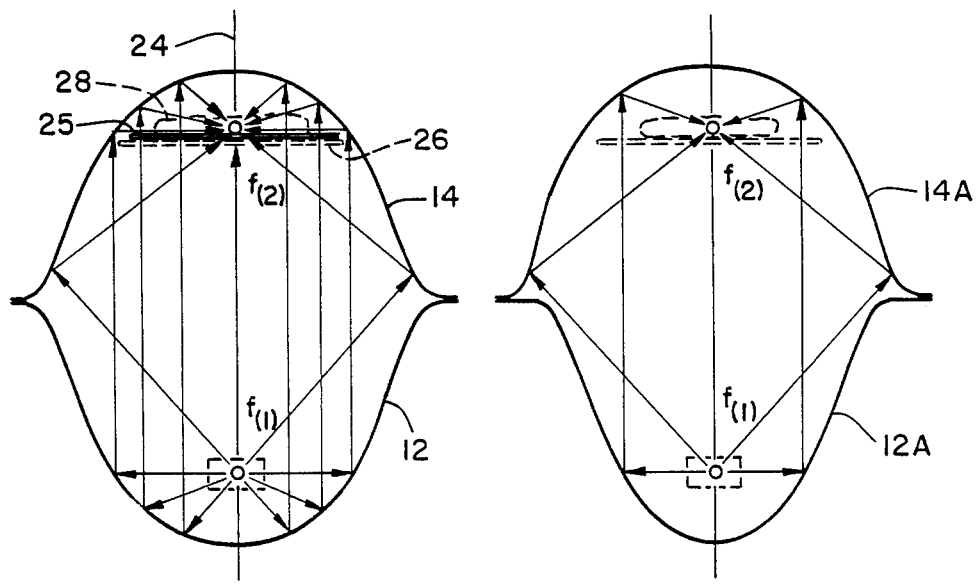
FIG. 2 is a cross-section showing a typical pair of paraboloids for use as receptacle and cover of cookers of this invention, with associated depiction of fuel, cooking surface and food.
FIG. 2A is a cross-section as in FIG. 2, showing similar use of non-congruent paraboloids.

FIG. 2 shows in cross-sectional illustration theoretical paths of travel of energy radiated from a point source f(1) at the focal point of the parabolic shape which represents receptacle 12, and shows illustrative paths of travel whereby the energy radiated from the point source at f(1) converges on the focal point f(2) in the upper cover 14. It is seen that, for purposes of this illustration, the receptacle 12 and cover 14 are substantially congruent, and are aligned along a common axis 24 which passes through the focal points f(1) and f(2) of the respective parabolas. As will be seen hereinafter, it is desirable, though not critical, that the radiant energy emanate from a small energy source, seen in dashed outline at f(1), and be directed to the general area of the focal point f(2) of cover 14. The functioning of the double paraboloid configuration as shown in FIG. 2 is fairly dependent on the capability of the parabolic shape of receptacle 12 to send parallel rays of energy out of receptacle 12 and toward cover 14. To that end, the energy source should be small, such as a single solid fuel article or a gas burner having a single orifice or a cluster of orifices in a small space. It is further desirable that the energy be somewhat dispersed in the area of f(2) so that it is concentrated on the surface area, or volume, of food which is located on the cooking surface. It is not particularly desirable that the energy be specifically focused at f(2) only, as such focusing on a spot, rather than on an area, would provide a hot spot, which would undesirably scorch the food at a particular locus. Thus, it is desirable that the design of the cooker accommodate a partial focusing of the radiant energy in the cooker in the area of focal point f(2)—and preferably distributed generally horizontally about f(2). The advantage of such dispersion is seen in terms of food 28 supported on cooking surface 26, which is shown without further support for simplicity of illustration. The concentration of significant amounts of energy at focal point f(2) with respect to the remainder of the surface and volume of the food of 28 would result in a substantially higher temperature at f(2) and a corresponding scorching of the food at that location. Thus, it is advantageous that the radiant energy be somewhat dispersed, preferably in a horizontal dimension about f(2). This provides for concentration of the radiant energy in the immediate vicinity of food 28, while not focusing it on a particular spot such that the food would be scorched in one location before it is appropriately cooked in another location. So recitation of the invention herein in terms of paraboloid shapes, especially with respect to cover 14, is specifically intended to include nearly-parabolic shapes which concentrate reflected energy on a surface or into a volume, as well as concentration onto a point—all best named as focal locus or focal loci.

FIG. 2A illustrates the use of the same principles of paraboloids as in FIG. 2, with the lower and upper paraboloids 12A and 14A being non-congruent. As seen the upper paraboloid 14A, representing the cooker cover, is larger in cross-section than the lower paraboloid 12A, representing the cooker receptacle.

Figure 3:
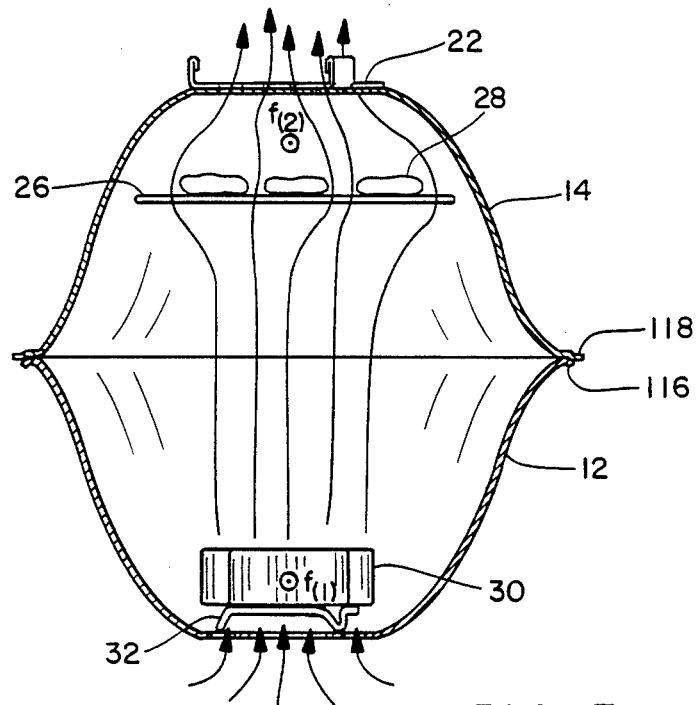
FIG. 3 is a cross-section of a cooker of this invention showing the major path of typical convective flow of gases through the cooker.
Figure 4:
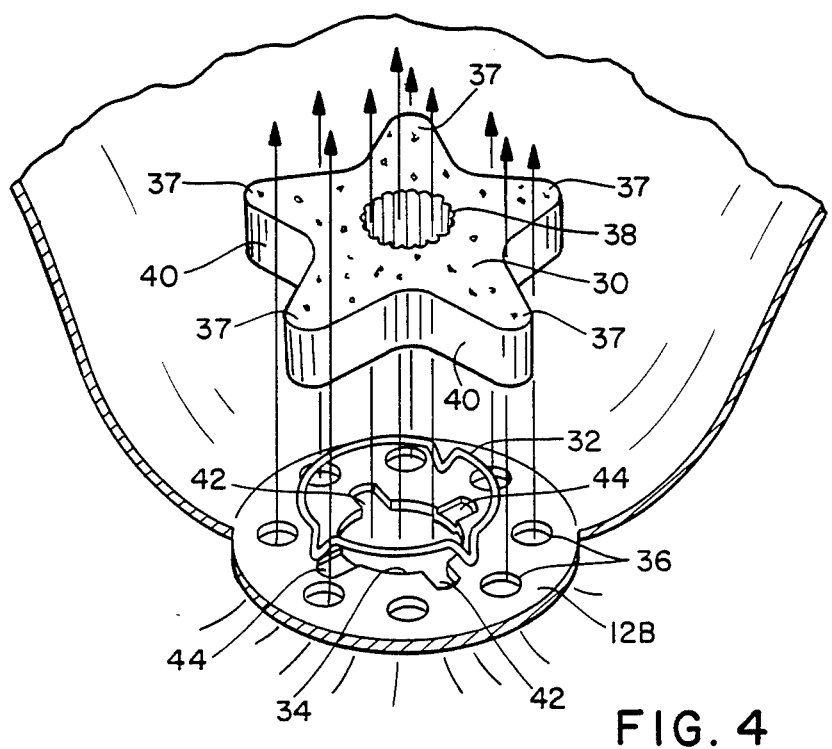
FIG. 4 is an enlarged cut-away view of the lower portion of the receptacle of a cooker of this invention.

FIGS. 3 and 4 illustrate the primary paths of flow of air and combustion gases through the preferred cookers of the invention. Referring first to FIG. 3, the fuel article 30 is on a combustion grate 32 in the lower portion of receptacle 12. With reference now to FIG. 4, combustion grate 32 is seen resting on the lower portion of receptacle member 12. A primary air inlet passage 34 is located centrally under combustion grate 32. A plurality of secondary inlet air passages 36 are located about primary air inlet passage 34. In the FIG. 4 illustration fuel article 30 is shown spaced from combustion grate 32, it being understood that, in its normal use, the fuel article 30 is positioned on the grate 32. As seen in FIG. 4, combustion air enters the receptacle through primary inlet passage 34 and the plurality of inlet passages 36.

Also as seen in FIG. 4, the preferred shape of fuel article 30 is that generally of a star having a plurality of projections 37 from a central locus of the star. A hole 38 in the star facilitates the continuity of a column of air traveling upwardly in the cooker. Hole 38 is positioned vertically above primary inlet passage 34 in the bottom of receptacle 12. Thus, combustion air passes through inlet passage 34 and may pass directly upwardly to, and through, hole 38 without substantial impedance from intervening structure.

Applicants have seen, from experimental observation, that ignition of a fuel article commences at sharp angled surface intersections, namely angles less than about 120°, of a fuel article, and at ends of projections, if any, from the fuel article. Surface intersections can be measured in linear dimensions, and generally comprise that area within 0.3 cm of a sharp angled intersection, or a rounded intersection of less than about 8 cm radius of walls meeting at 120° angle or less. Projections can be measured in either 1 or 2 dimensions. Ignition properties of fuel articles are enhanced by the substantially greater occurrence of intersections, and by the projections 37 of the preferred starshaped fuel articles seen in FIG. 4. Sharp angled surface intersections are on the top and bottom of the fuel article where the top and bottom surfaces intersect vertical surfaces 40 and the walls of hole 38. When ignition is taking place on fuel articles, it preferentially starts at the surface intersections and the ends of projections 37, and spreads from there.

Depending on the relative sizes of holes 34 and 38, a portion of the air entering the cooker at passage 34 may pass over the bottom of fuel article 30 and then upwardly about its sides. Additional air for the combustion process, and which may have a stabilizing affect on the convection column passing upwardly through the cooker, enters the receptacle at secondary air inlet passages 36 which are located about primary inlet passage 34. Air entering at inlet passages 36 is conveniently spaced from the center of the fuel article 30 at approximately the same distance as the vertical edges 40 of the fuel article 30. Air entering secondary air inlet passages 36 thus passes in close proximity to vertical surfaces 40 and provides combustible oxygen for burning of the surfaces 40. The overall effect of air entering the cooker through inlet passages 34 and 36 is that there is a primary direction of movement of air upwardly through the passages 34 and 36, through hole 38, and about the vertical surfaces 40 of the fuel article, such that the surfaces 40 and hole 38 are presented with appropriate amounts of oxygen for proper combustion at surfaces 38 and 40. In addition, air flows about the top and bottom surfaces of the fuel article 30 and provides oxygen to support combustion of those surfaces, with minimal disruption of the flow of air in a convective, upwardly-moving direction.

Referring again now to FIG. 3, the overall passage of the air convection column through the cooker is seen to flow inwardly, at inlet passages 34 and 36 as seen hereinabove, and to pass upwardly as a convective air column from the fuel article 30 toward the cooking surface 26 and the food 28. As the air column reaches the area of the cooking surface and the food, it passes preferably through the cooking surface and around, and between, the pieces of food. It passes from the food locus upwardly and out of the cooker vent 22 which serves as an air outlet passage. This essentially vertical passage of air and combustion gases through the cooker provides for convectively concentrating the cooker's heat in a column which passes over and through the locus of the food which is being cooked. Simultaneously, radiant energy from the fuel article 30 is being radiated generally according to the configuration seen in FIG. 2 such that the radiant energy also is concentrated about the locus of the food 28. Thus, the instantaneous affect of the shape of the cooker is to concentrate the heat which is intended for cooking food in such a way that it is effectively and efficiently used for the cooking purpose. Any closure, or partial closure, of vent 22 impedes direct flow of gases out of the cooker, and results in convective mixing of gases in the cooker, dispersing the convective concentration of heat, such that the cooker acts, convectively, much like a conventional cooker, as well as reducing burn rate of the fuel due to reduced oxygen flow to the fuel.

A beneficial affect of the concentration of the energy generated by burning the fuel article 30 is that the amount of energy otherwise directed at other portions of the cooker, where it may be wasted, or undesirable, is reduced. Referring to FIG. 2, in an experiment with a cooker of the design and shape seen in FIGS. 1, 2, and 3, measurements were taken at plate 25 during the typical operation of the cooker. Specifically, the plate 25 is located at the focal point f(2) of the paraboloid of cover 14. In steady state operation of the cooker, as seen in FIGS. 2 and 3, the temperature at plate 25 was about 380° F. to about 590° F.

The cooker as described so far, has been illustrated with the use of a single fuel article. Experimental tests have shown that a single fuel article may be used in a cooker of the invention having dimensions of about 25 cm. diameter and wherein the cover and receptacle members are each about 11 cm. in height, such that the overall dimensions from the bottom of the receptacle 12 to the top of cover member 14 is about 22 cm. The diameter of the cooker is about 25 cm. A cooker having the approximate dimensions as indicated hereinabove and having properly reflective interior surfaces, which may be, for example, moderately polished aluminum, will operate with the indicated temperatures when using a single fuel article as illustrated in FIG. 4 and having a mass of about 25 to about 60 grams. Other fuel articles, typically of the charcoal type, and having similar burning characteristics will provide similar heat outputs. While a substantial range of temperatures is contemplated, it is seen that there is substantial difference in the temperature distribution in a conventional cooker as compared to the cookers of this invention. The numerical data illustrate that the cookers of this invention do concentrate heat in the area of the food, as compared to having a more nearly uniform heat distribution about the upper portion of the cooker and particularly at the cooking surface 26, as in conventional cookers.

Figure 5:
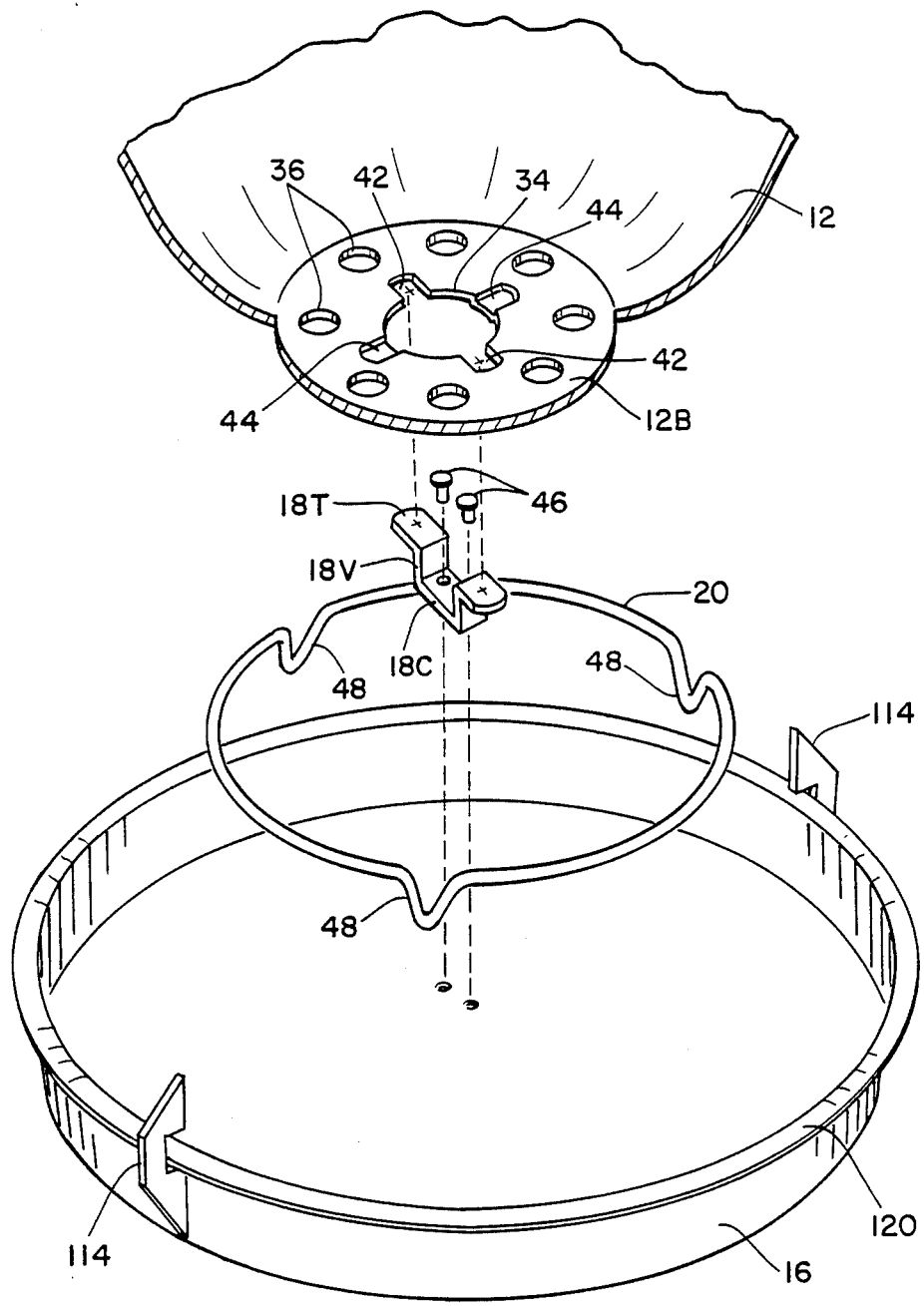
FIG. 5 is an exploded diagram, with parts cut away, and showing the assembly relationships for assembling the pan to the receptacle, for cooking.

Referring now to FIGS. 4 and 5, a pair of latch slots 42 are incorporated opposite each other into primary air inlet passage 34. A pair of latch seats 44 are located angularly with respect to latch slots 42. Referring now to FIG. 5, the latch 18 has a central segment 18C, two vertical members 18V extending from the central segment, and a pair of latch tabs 18T extending generally horizontally from the vertical members. The latch 18 is assembled to pan 16 by a pair of rivets 46. Latch 18 may be separably attached to the bottom 12B of the receptacle by inserting tabs 18T into latch slots 42 and rotating pan 16 with respect to receptacle 12 such that tabs 18T are seated in latch seats 44.

Figure 16:
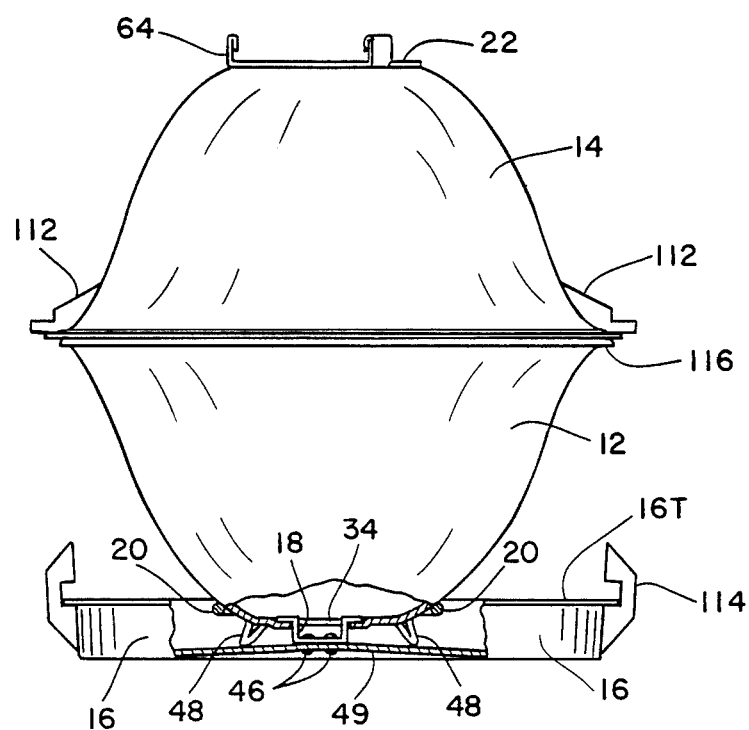
FIG. 16 is a partially cut-away side view of a cooker of this invention in its cooking configuration, and showing the relationship between the top of the pan and the hole in the bottom of the receptacle.

The biasing ring 20 is incorporated into the assembly at the time the latch is separably attached to receptacle 12 by means of the latch slot 42 and the latch seats 44. Biasing ring 20 tends to bias the receptacle 12 away from pan 16. The configuration, resilience, and deformability of biasing ring 20 are such that biasing ring 20 deforms with substantial preference to latch 18, such that latch 18 holds receptacle 12 to pan 16 while the resilient construction of ring 20 provides a force urging receptacle 12 and pan 16 away from each other. In the process of assembling receptacle 12 to pan 16, the latch 18 has previously been assembled to the pan. Biasing ring 20 is then interposed between pan 16 and receptacle 12, with the affect that biasing ring 20 accommodates the latching of latch 18 to receptacle 12 in the presence of a modest amount of force urging receptacle 12 toward pan 16. A modest amount of force causes deformation of ring 20 such that the receptacle and pan can be moved toward each other for the entry of latch tabs 18T into latch slots 42, and their subsequent rotation to latch seats 44. The deformation of biasing ring 20 may be by means of outward rotation of legs 48 in either a clockwise or counterclockwise direction. Further deformability of biasing ring 20 is seen in the spreading of legs 48 outwardly. Other means and designs of deforming similar biasing means are contemplated as derivations of biasing ring 20. The resulting function of biasing ring 20 is that of deforming during the process of attaching pan 16 and receptacle 12 to each other by means of latch 18. Biasing ring 20 also serves as a primary means of support of receptacle 12 at its location at a substantial distance from latch 18, and may be considered as part of the attachment between pan 16 and receptacle 12. The stabilizing effect of biasing ring 20 is that the biasing ring supports receptacle 12 and serves as a primary shock absorber to absorb shocks occurring to either receptacle 12 or pan 16, such that substantial portions of twisting or torsional forces are absorbed by ring 20 rather than by latch 18. Ring 20 has substantial capability to absorb such stresses without significant damage, whereas latch 18 could readily be loosened from pan 16 by means of such stresses, by virtue of the leverage between pan 16 and rivets 46. Comparative leverage with respect to biasing ring 20 is substantially less. In its support and stabilizing function, ring 20 holds receptacle 12 spaced away from pan 16 such that air can flow unimpeded to air inlet passages 34 and 36. The biasing force pushing pan 16 and receptacle 12 apart at ring 20 has a balancing counterforce pulling the same members toward each other at latch 18. Consequently, these competing forces pull the center of pan 16 upward as seen at 49 in FIG. 16 and push pan 16 down around the legs of ring 20. This, pan 16, having a generally flat bottom, contacts an underlying flat surface, such as a table or floor, at portions spaced from uplifted central portion 49, with the resultant stabilizing affect of this spaced support.

Figure 6:
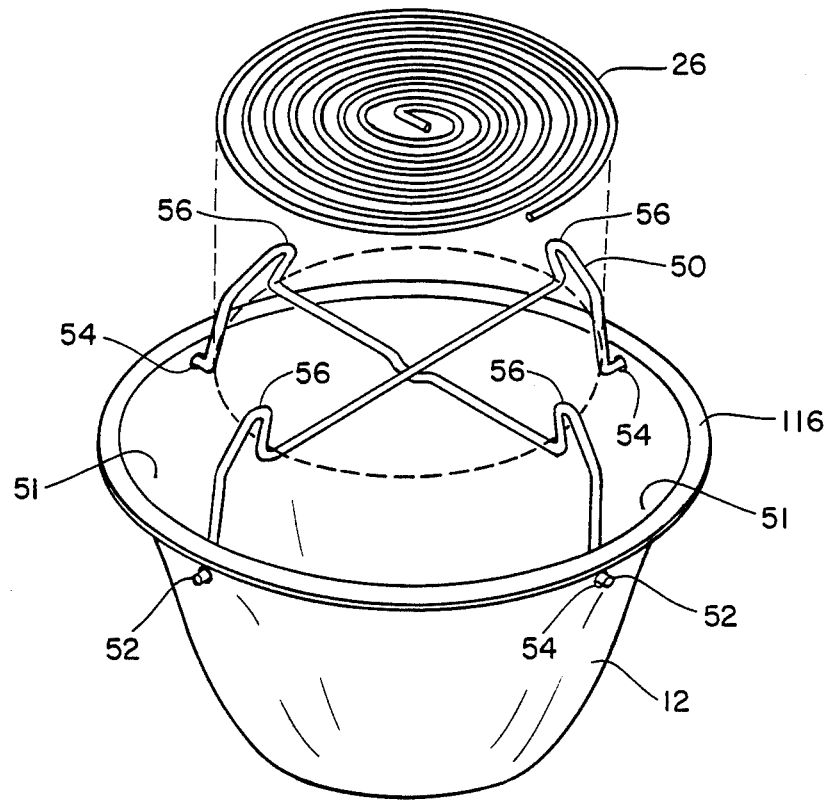
FIGS. 6 and 7 show the assembly of the cooking surface into the cooker, its support from the receptacle, and the indexing with the cover.
Figure 7:
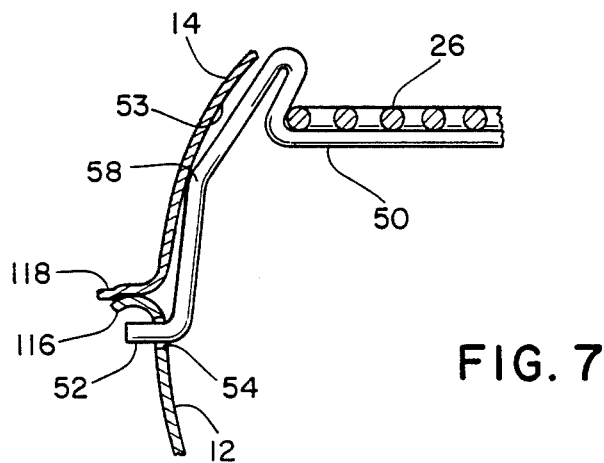

FIGS. 6 and 7 show the cooking surface 26 as a designed location for cooking food, and its preferred support means 50. Support means 50 is supported from receptacle 12 by a plurality of end members 52 projecting through corresponding holes 54 in receptacle 12.

In the preferred embodiments, the cooking surface 26 has minimal contact with the cooking surface support 50 and the cooking surface support 50 has minimal contact with the receptacle 12. Desirably, the cooking surface 26 is made in such a way that it has a snap-in, snap-out, capability with respect to cooking surface support 50. In the illustrated embodiment, the cooking surface 26 is made of a length of resilient wire, which may be secured to itself at appropriate locations in order to retain its wound configuration. Cooking surface 26 may have an open grate configuration as shown, or a partially open configuration, or less preferably, a closed surface having essentially no openings therein, such as a pancake griddle. Cooking surface 26 is spaced from receptacle 12 and any of its wall portions 51, as seen in dashed outline in FIG. 6. Cooking surface 26 is also spaced from wall portions 53 of cover 14 as seen in FIG. 7. The spacing from receptacle 12 is primarily that of vertical displacement of cooking surface 26 above the top of receptacle 12, into the interior space defined by cover 14, and has a primary purpose of locating the cooking surface near the focal locus of parabolic cover 14. Also with respect to the top of receptacle 12, cooking surface 26 is of a reduced diameter. The overall result is that there exists a substantial spacing between cooking surface 26 and the top of receptacle 12. For purposes of measuring, the spacing measured as the farthest distance between cooking surface 26 and an adjacent portion of receptacle 12. This space is advantageous for any desired manipulation of the fuel without moving cooking surface 26, and may be used with or without a parabolic cover. Cooking surface support 50 has minimal contact with receptacle 12 at holes 54, and does not otherwise impede access between cooking surface 26 and receptacle 12 in addition to its supporting legs. Additional impedances are acceptable to the extent they allow continued access to the fuel on grate 32.

The cooking surface support, as illustrated in FIG. 6, is made from two lengths of wire which are welded at 90° to each other at their mid points. The support 50 is formed by bending the wires to have a plurality of S-shaped curves 56 therein for resiliently receiving the cooking surface 26. The cooking surface, being a helically wound wire, is resiliently deformable so as to securely snap into place on the cooking surface support, as seen in a single dashed outline passing through the S-shaped curves in support 50 in FIG. 6.

Cooking surface 26 and support 50 may be configured as a single element of the cooker. The recitation of the cooking surface and support herein is intended to encompass both separate elements and their combination as a single element.

From the engagement of each cooking surface support end member 52 at holes 54, each leg of the cooking surface support projects upwardly to a point that is near the inner periphery of cover 14, as seen in FIG. 7. The legs of the support 50 are then bent slightly inwardly away from the inner surface of the cover as illustrated in FIG. 7. This bend 58 provides an index for maintaining the cover in position. When the cover 14 is in position over the cooker, it is marginally spaced from the indexing bends 58 in cooker support 50. If cover 14 should move, it contacts one or two of the indexing bends 58 and is prevented from being further displaced. Each bend contacts the cover at only one point and conduction heat loses to the cover are thereby minimized. Similarly, support end members 52 contact the receptacle at holes 54 with minimal contact. Also combustion grate 32 contacts receptacle member 12 at only three locations as seen in FIG. 4, namely the legs of combustion grate 32. This minimizing of the touching between heated internal support members and the receptacle and cover combines to minimize the loss of heat by conduction from these support members to the outside surface of the cooker, as represented by receptacle 12 and cover 14.

FIG. 8 shows cover 14 in combination with vent 22. Vent 22 is attached to cover 14 by a rivet 60. A plurality of holes 62 in vent 22 may be aligned with corresponding holes in cover 14, such that air and combustion gases may be vented from the cooker. A plurality of tabs 64 extend upwardly from vent 22. Each tab 64 has a folded over terminal portion 66 which is bent inwardly and downwardly. A cap 68 is formed generally in the shape of an inverted cup. A retaining ring 70 extends about the base of cap 68. Slots 72, in ring 70 correspond to respective tabs 64. Cap 68 may be seated on vent 22 by aligning slots 72 with tabs 64 and seating the cap 68 on the vent 22 with the tabs positioned in slots 72, such that terminal portions 66 of tabs 64 are above the top of ring 70. Cap 68 is then rotated with respect to tabs 64 such that terminal portions 66 engage the top of ring 70, thus removably securing cap 68 to vent 22, and consequently to cover 14. Cap 68 is seen assembled to cover 14 in FIGS. 14 and 15, described in more detail hereinafter.

The bottom side of cap 68, which is not visible in FIG. 8, has incorporated therein a plurality of features which are additionally useful with the cookers of this invention. Cap 68 as seen in FIG. 8 has been inverted in the illustration in FIG. 9 so that the hidden bottom surface of cap 68, as seen in FIG. 8, is displayed in full top view in FIG. 9. Cap 68, as seen in FIG. 9, has a second function much like that of a cup. Thus, it is that the article referred to as cap 68 may also be referred to as cup 68C with respect to the usages depicted in FIGS. 9–12. FIG. 10 is the same cup as seen in FIG. 9 and having a star shaped fuel article therein for treatment as described hereinafter. The functional use of cup 68C as seen in FIGS. 9–12 is as a container means for assisting in applying lighter fluid to a fuel article of the invention. As seen in FIGS. 9, 10, and 11, the primary shape of the cavity in cup 68C is that of a star, and corresponds to the star shape of the fuel anticipated for use therein. The corresponding shape is seen with the star in the cup as in FIGS. 10 and 12. A secondary recess 74 is shown in cup 68C, and is readily seen in combination in FIGS. 9 and 11. The secondary recess conforms in shape to a second shape of fuel article. The secondary recess shown in FIGS. 9 and 11 corresponds to that of a conventional pillow-shaped briquette, as is in use in the conventional charcoal art. While the cookers of the invention are believed most suited for use with star-shaped fuel articles as seen in FIGS. 4, 10, and 12, it is anticipated herein that the cookers of the invention may be successfully used with conventional pillow-shaped charcoal briquettes, and so the cup 68C has been adapted so that it can be used with either of those shapes. Other shapes may be incorporated into the cookers and/or the cups/containers of this invention using similar principles.

Referring now to FIGS. 9, 9A, and 10, the secondary recess 74 has a conventional piece of velcro fastener 76 positioned in the bottom of the recess. A plug 78 in the shape of the recess 74 has a second, and mating, piece of velcro 80 attached for mating relationship with the velcro 76 in the recess. Referring to FIG. 11, plug 78 is shown in position in recess 74 with the two pieces of velcro 76 and 80 being in mating relationship. With plug 78 thus in place, the bottom 89 of cavity 82 is thus generally planar and corresponds with the planar bottom surface of the star shaped fuel article as seen at 30, for example, in FIG. 4.

Upstanding walls 84 of cavity 82 are spaced from fuel article 30 at the upper portion of the cavity 82 and extend generally downwardly. At an intermediate locus 86 in the descent of upstanding walls 84 toward the bottom 89 of cavity 82, walls 84 begin to taper inwardly as at 88 such that they meet the bottom 89 of cavity 82 in a peripheral outline corresponding approximately to the exterior shape of the fuel article contemplated for use; in this case a star-shaped fuel article having a hole in it. The slope of the inwardly tapered portions 88 of walls 84 varies about the circumference of cup 68C, according to the shape of the cavity. For example, where the ends 37E of the projections 37 of the star most closely approach the outer circumference of cup 68C there is a steep slope between the top of cavity 82 and the bottom 89 of the cavity. At locations intermediate the star projections 37, the slope between the top of cavity 82 and the bottom 89 of cavity 82 is more gradual. The overall affect is that a liquid poured into cup 68C travels downwardly on sidewalls 84 and converges on the fuel article 30 around the base thereof. To the extent liquid is poured into the cavity, in the presence of a fuel article, it is encouraged by the slopes of sidewalls 84 to flow downwardly and toward the fuel article.

In use, the cup 68C functions as a means for applying lighter fluid to, for example, a charcoal fuel article while maintaining control of the lighter fluid such that it is not dripped, spilled, or otherwise wasted. The fuel article and the lighter fluid are combined in cup 68C and left in combination with each other for a period sufficient that the lighter fluid is absorbed into the fuel article. The fuel article may first be placed into the cup 68C and the lighter fluid added. After the lighter fluid is added, it is left for a period of time while the fluid is absorbed into the fuel article. Alternatively, the lighter fluid may be added to the cup in the appropriate quantity, and the fuel article then subsequently added to the lighter fluid.

Where a plurality of fuel articles are to be used, as with a conventional cooker, the amount of lighter fluid applied to a particular fuel article is not particularly critical, as any deficiency of ignition properties of one fuel article may be attenuated by surplus heat available from an adjacent, sufficiently treated, fuel article, which ignites as planned. So the overall amount of lighter fluid used is not critical, so long as a minimal number of fuel articles are adequately treated with the lighter fluid. When using a single fuel article, however, there are no accompanying fuel articles to be relied on, and so the use of the appropriate amount of lighter fluid is more important. While conventional piles of, for example, charcoal briquettes may be treated with less than half the recommended amount of lighter fluid, and ignited, albeit with difficulty, a single fuel article should be treated with at least 70% of the recommended amount of lighter fluid, which is about 1 cm$^3$ lighter fluid per 15 grams of charcoal, with deviation of up to 30% being satisfactory.

In the preferred embodiments of cup 68C there is included an indicating means 90, for indicating the proper amount of lighter fluid to be added to the cup for application to the fuel article. Line 90, as seen in FIG. 11, is essentially a break in wall 84 at the volume which, when combined with the typical volume of the fuel article, provides the appropriate amount of lighter fluid which should be added to the fuel article for efficient ignition. As best seen in FIG. 11, walls 84 guide fuel article 30 to the bottom of the cavity as fuel article 30 is put in cavity 82. Similarly walls 84 guide lighter fluid to the fuel article, and particularly to the constriction area where the fuel article is adjacent walls 84 at the bottom of the cavity.

The cavity 82 may have a plurality of volume indicators, and may be configured such that it has a variable volume indicator. It is preferred that the volume indicator be structural, such as the ridge shown at 90. A second volume indicator in FIG. 11 may coincide, for example, with another structural feature such as intermediate locus 86. In that respect, ridge 90 may serve as an indicating means for use with a star shaped fuel article 30 as shown in FIG. 11, with intermediate locus 86 serving as indicating means for use with the second fuel article shape.

Where a conventional pillow-shaped briquette is to be treated with lighter fluid, plug 78 is removed as from the bottom of cavity 82 in FIG. 9, and a briquette is placed in the cup along with an appropriate amount of lighter fluid to be absorbed by the briquette. To that end, intermediate locus 86 may be so positioned as to serve as the indicating means which identifies the appropriate volume of lighter fluid which should be added to the cavity in order to provide the appropriate volume of lighter fluid in combination with a briquette in secondary recess 74. Another embodiment of the volume indicator means is seen illustrated in FIG. 11B as wall 92 which is intended to be that portion of wall 84 which extends above intermediate locus 86. Indicator means 92 is variable in the sense that it is spaced from fuel article 30 such that, for a given incremental change in height of fuel article 30, the incremental volume of the cross-section of the cavity at that height is approximately equal to the sum of the incremental volume of the fuel article 30 which would occupy that cross-section in combination with the appropriate incremental volume of lighter fluid which should be used for treating the respective incremental volume of the fuel article. In that regard, when using a cup 68C as in FIG. 11B, with its variable volume indicator, the total volume of lighter fluid to be used in treating a fuel article is that volume of lighter fluid which is required to bring the level of the lighter fluid to the top of the fuel article. Thus, the volume of the fuel article works in combination with the cross-sectional volume of the cavity to define the amount of lighter fluid which is appropriate for use in treating that fuel article as that quantity of lighter fluid which will fill the cavity up to the level of the top of the fuel article. By so conforming the cooperative shapes of the fuel article and the cavity, a variety of thicknesses of fuel articles of the given shape may be treated with lighter fluid in the cavity by combining with each fuel article the amount of lighter fluid which brings the level of lighter fluid in the cavity to the top surface of the fuel article. A different locus on the fuel article may, alternatively, be selected for use as the indicator when combined with the volume of the cavity.

FIG. 11A shows an exemplary view of the top surface of the plug seen in FIG. 9A. Significantly, it is preferred that the top surface 94 have a plurality of raised portions 96 thereon which raise fuel article 30 slightly above the bottom 89 of cavity 82. By thus raising fuel article 30 slightly above the bottom of the cavity, there is provided space for the lighter fluid to flow underneath the fuel article in order to contact the bottom surface of the fuel article and to equalize the fluid levels between the hole 38 in the fuel article and the outside vertical surfaces 40 of the fuel article.

FIG. 12 shows an alternate, and shallower embodiment of the cup 68, wherein the cup is used as a means for containing the lighter fluid which may run off fuel article 30, and redirecting it to the fuel article at its base. The cap/cup combination in its shallower embodiment as illustrated in FIG. 12 is more desirable where compactness of the overall cooker is of substantial importance.

FIG. 13 shows a cross-section of a fuel article 30 in a receptacle type container 98 of the nature of the cup 68C, but wherein the receptacle type container is a package for fuel article 30 rather than being an element of cooker 10. The shape of container 98 on its interior resembles the shape of the interior of cavity 82, with a similar spacing between fuel article 30 and the walls 100 of the container 98. Walls 100 of container 98 correspond to walls 84 of cup 68C. Lid 102 serves as a package closure, and has a tab 104 for removal of the lid and opening of the package. Upon removal of lid 104 a ridge 106 is exposed, and may serve as an indicator means with the same function as ridge 90 in cup 68C. The package of FIG. 13 is thus a combination of a packaging container, a fuel article, and optionally, upon opening thereof, a means for measuring the appropriate quantity of lighter fluid to be added to the fuel article 30 for treatment of the fuel article. The bottom wall 108 of the package may have raised portions, not shown, the same as portions 96 in FIG. 11A. Container 98 may be constructed of any of a plurality of materials, so long as it properly protects the fuel article 30 and retains its shape through the period of intended use, namely the application of lighter fluid to the fuel article. Exemplary material for use within container 98 is paperboard, and particularly coated paperboard which reduces the flow of lighter fluid through the paperboard itself. A particularly desirable paperboard is coated with one of the thermoplastic polymers, such as a polymeric olefin or a polymeric ester. Such materials are substantially rigid in that they normally hold a specific shape when being handled and transported, although they can be permanently deformed by rough handling or damaging handling. They are relatively inexpensive, and may be used as part of the ignition medium when the fuel article is ignited. For example, the fuel article may be treated with lighter fluid and placed on combustion grate 32 for the ignition and combustion of the fuel article. In the alternative, and preferably, where container 98 is made of a relatively combustible material, such as coated paperboard, the container itself is flammable, and may be used as part of the ignition sequence. To that end, the method of using the fuel article and the container begins with the addition of the lighter fluid to the fuel article and the elapse of an appropriate amount of time for the absorption of the lighter fluid into the fuel article. At that point the fuel article may be left in container 98. A series of holes may be made in the container 98 to allow air flow upwardly adjacent the fuel article. The container, with the fuel article, may then be placed on combustion grate 32 and ignited as by a match, an electrical ignition coil, or other ignition means. The ignition means may be used to ignite either the fuel article itself or the container 98. By igniting the combination of the container and the fuel article, the burning properties of the container may be taken advantage of in that they may assist in the ignition of the fuel article, while eliminating the potential for littering, etc. of throwing away container 98, along with any possibility that residual lighter fluid in container 98 might inadvertently cause an undesired fire.

The combination of the lighter fluid in the fuel article 30 and container 98 serves as a means for igniting fuel article 30. As container 98 is consumed, the heat generated by its burning is added to the heat generated by burning the lighter fluid in fuel article 30, such that the combination provides for the ignition of the fuel article. If desired, lid 102 may be placed in the same fire and consumed at the same time, both to eliminate waste and to add to its heat of combustion to the ignition sequence. Lid 102 is preferably made of paperboard, though other materials, either combustible or noncombustible may be substituted. It is entirely possible that the fuel article be removed from container 98 after treatment with lighter fluid, and placed directly on combustion grate 32, as seen in FIG. 3, for the ignition sequence.

Alternate materials for construction of container 98 include, for example, thermoformed plastics and metal foil. The material of construction of container 98 is not particularly important, nor is the material of construction of lid 102 particularly important, although it is desirable that the material of either be combustible so that it may be used, and consumed, in the ignition sequence. Such use however, is not particularly critical, as the ignition sequence may be followed satisfactually without the use of the heat of combustion of the container 98 or lid 102.

The indicator in the cup 68C and the container 98 may take on a variety of forms in the several embodiments. The ridge 90 or 106 is one form of indicator means. Another form of indicator means is seen at wall portion 92 as indicated earlier hereinabove. A further indicator means is seen at intermediate locus 86. Still another indicator means may be a visible mark on the cavity, which may or may not correspond with an identifiable structural feature of the cup. Such a mark may be made for example by ink, or paint. Thus, it is seen that cup 68C and container 98 may take on a variety of forms for use as a lighter fluid application means.

While cap 68 need not necessarily include a cup 68C for use in treating one or more fuel articles 30 with lighter fluid, same is preferred in order to obtain maximum utility out of one of the functional elements of the cooker.

The preferred embodiments of the cooker are relatively small in size and light in weight, as compared to conventional charcoal cookers. A secure and stable assembly is essential to the safe use of such light weight cookers.

One of the outstanding features, then, of the cookers of this invention is that they are suitable for use in compact areas. To that end, the cookers also have a compact storage configuration, wherein the volume is substantially reduced from the volume in its use configuration. In that regard, the volume in its use configuration includes the space between pan 16 and receptacle 12.

Figure 14:
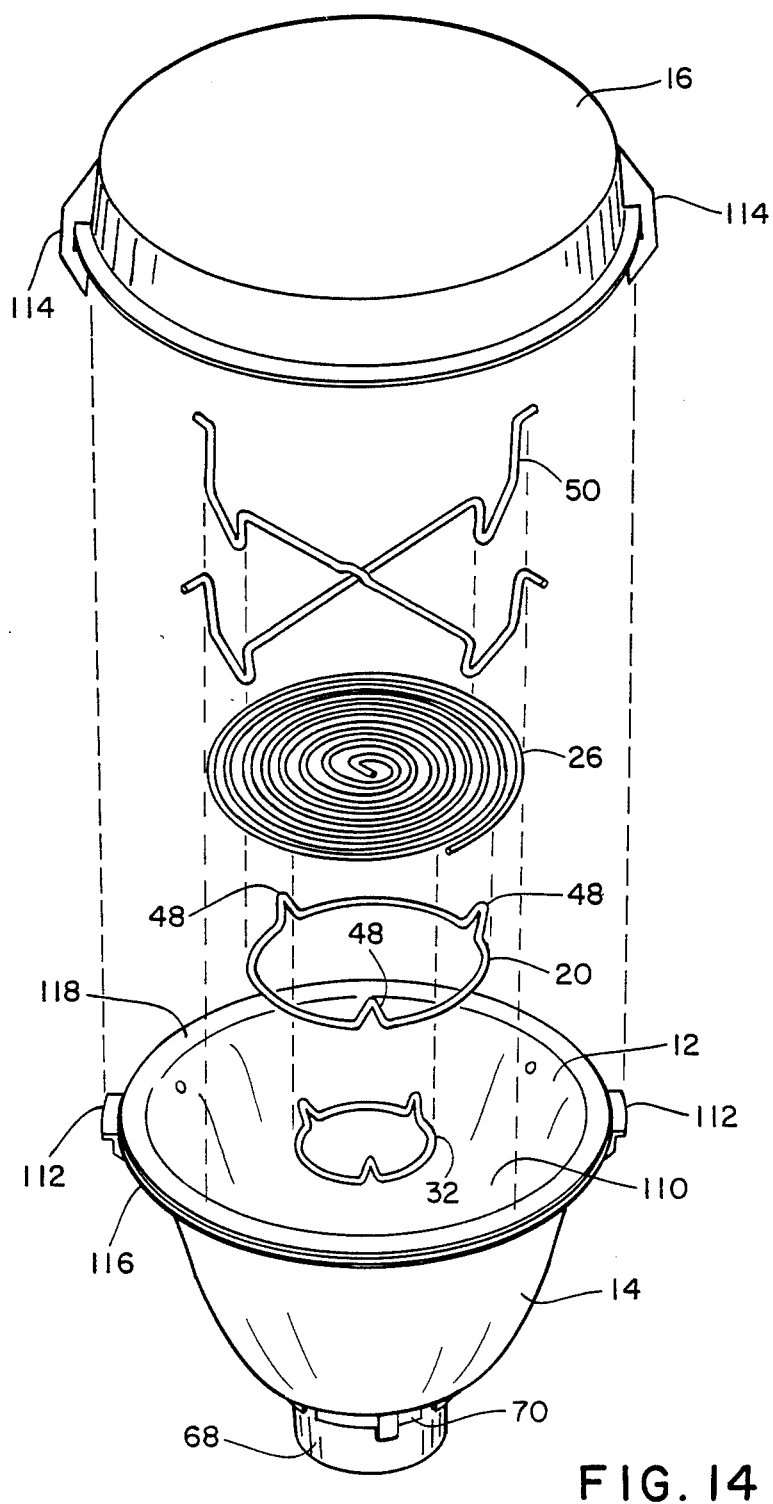
FIGS. 14 and 15 show an exploded diagram of a storage assembly configuration of cookers of this invention, and a pictorial view of the assembly in the storage configuration.

Referring now to FIG. 14, there is seen an exploded diagram of the various components in the cooker and showing their relative relationships with each other as regards the storage configuration. In FIG. 14, receptacle 12 has been nested inside cover 14. The nest has a large opening 110 at the top thereof, and optionally has a smaller opening at the bottom thereof comprising air inlet passages 34 and 36 and outlet passages 62 in vent 22, which inlet and outlet passages may or may not be aligned. The smaller opening is covered by cap 68 in FIGS. 14 and 15, with terminal portions 66 of tabs 64 being retained on ring 70. Cover 14 has a pair of handles 112 adjacent large opening 110.

In the storage configuration, cooking surface 26 is assembled to cooking surface support 50 in its usual manner. Biasing ring 20 is assembled to cooking surface 26 by inserting legs 48 of biasing ring 20 into cooking surface 26 and rotating ring 20 with respect to cooking surface 26 such that the helical winding of cooking surface 26 is deformed by the rotation of legs 48 and thereby holding legs 48. Similarly the legs of combustion grate 32, which grate is smaller in diameter than biasing ring 20, are inserted into cooking surface 26 and rotated for the similar assembly of combustion grate 32 to the cooking surface 26. Other means of similarly securing the legs of grate 32 and ring 20 are contemplated. Thus, there is made a subassembly of cooking surface 26 assembled to support member 50, and including biasing ring 20 and combustion grate 32 assembled to cooking surface 26. This subassembly is then inserted into the large opening 110 in the nest.

Figure 15:
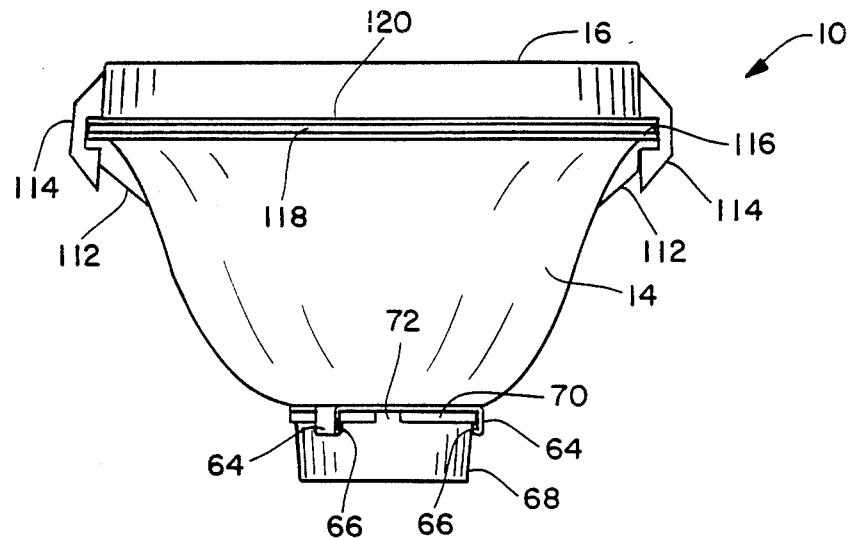

Pan 16 has a pair of handles 114 capable of engaging handles 112 on cover 14. With the cooking surface and support subassembly emplaced in the nest, pan 16 is placed over the large opening in the nest and handles 114 on pan 16 are rotationally engaged with handles 112 on cover 14. The resulting assembly is seen in FIG. 15, in which pan 16 functions as a closure over large opening 110 of the nest; and completing the closure of the package. The general outside surface of the package, then, comprises pan 16 on one end, cap 68 on the other end, and cover 14 at intermediate surfaces therebetween. The outer surface may include small holes and spaces, so long as none of the enclosed elements could readily fall out. Cover 14 and pan 16 are joined by handles 112 and 114. A lip portion of receptacle 12 may extend to the outer surface of the closed assembly. In some embodiments, cover 14 is nested inside receptacle 12 with corresponding modifications to vent 22 and cap 68.

With the cooker thus reassembled in its storage configuration, all of the members on the interior of the cooker enclosure, including the cooking surface 26, support 50, biasing ring 20 and grate 32, are securely held inside the enclosure, such that those members cannot fall out of the enclosure and be lost. As seen in FIGS. 14 and 15, the several members enclosed within the cooker cannot fall out, irrespective of the attitude of the cooker, with respect to tipping and the like. The joining of handles 112 and 114 holds the enclosure closed. Handles 112 and 114 are exemplary only, as the handle design is not critical so long as means is provided for holding the enclosure closed. Thus handles 112 and 114 may, for example, be reconfigured such that one of them rotates about an axis projecting through that handle to thereby secure the closure.

It is important that the inside member of the nest, whether receptacle 12 as shown in FIG. 14, or cover 14, have minimal projections, particularly on its outside surface, so that the nest members, namely cover 14 and receptacle 12, may be closely spaced or touching in the nested configuration. Receptacle 12 is shown with no projections, such that the nest with receptacle 12 as the inner member may include surface-to-surface contact between receptacle 12 and cover 14, thereby contributing to minimizing the volume of the cooker in the storage configuration.

A substantial feature of the closed assembly of the preferred illustrated embodiments is that cap 68 serves as a protective closure over vent 22, whose vent tabs 64 are somewhat susceptible to damage as by bumping or other impact. Thus is cap 68 capable of serving another function of protecting the top of the cover 14 from damage during storage or transport periods.

A particularly advantageous feature of the invention is that the cookers disclosed herein may be packaged for commercial sale in the storage configuration, such that no substantial assembly operations are required beyond those which would be used in the normal use functions of the cooker. Specifically no tools are required for assembly, whereas tools commonly are required for assembly of the most commonly available commercial cookers. Similarly, no tools are required for disassembly or reassembly to the storage/transport configuration, wherein preferred embodiments of cookers of the invention become essentially totally enclosed with a reduction in volume of up to about 50%.

It should be noted, for example in FIGS. 1, 7, 14, and 15, that receptacle 12 has a lip 116 and cover 14 has a corresponding lip 118. Similarly pan 16 has a corresponding lip 120. In the use configuration, lips 116 and 118 of the receptacle and cover respectively adjoin each other as seen in FIG. 7. In the storage configuration, as seen in FIG. 15, lips 118 and 120 adjoin each other and serve as the closure joint between pan 16 and the nest.

In some embodiments, receptacle 12 and/or cover 14 may have shapes other than parabolic, while still taking advantage of other aspects of the invention, such as the raised cooking surface, the minimal contact points, the storage configuration, and the like.

Thus, it is seen that the cookers of the invention provide substantial benefit over cookers of the conventional art. The cookers may be smaller and more compact. They may be used in smaller spaces. The danger of burns to the user are reduced. The cooker may be easily assembled, disassembled, and reassembled for storage in a smaller volume. The cooker has inherent stability but virtue of its assembly with the biasing ring in combination with the latch means. The combustion grate and the cooking surface have substantially minimized capability for transferring heat to the outer surfaces of the cooker by conduction. The designed flow of air and combustion products by convection through the cooker minimizes the convection transfer of heat to the outside walls of the cooker. The inside surfaces of the cooker may be shaped such that they have the functional advantages of the paraboloid shape, for concentrating the radiated heat from the energy source to a designed location near the locus of focus of the paraboloid-type of the cover. The cooking surface and its support are securely attached to the cooker, while being readily detachable therefrom. In the storage configuration all the components are secured together with the cooking surface serving as a means for holding the biasing ring and the combustion grate. The cooker caps have dual function as a cup for treating a fuel article with lighter fluid. The cup preferably has means for indicating the appropriate quantity of lighter fluid to be added to the fuel article.

What is claimed is:

1. A cooker comprising an upper cover member having a first inner surface, and a lower receptacle member having a second inner surface, the shape of said first inner surface comprising a first paraboloid.

2. The cooker as in claim 1, said first surface being substantially reflective of radiant energy, said cooker including a cooking surface for cooking food thereon, the effective focal locus of said paraboloid substantially coinciding with a cooking location on said cooking surface.

3. The cooker as in claim 2, and including means for generating a centralized connective heat transfer column, extending from a lower air inlet to an upper outlet, whereby the temperature in said heat transfer column is substantially higher than the temperature near adjacent portions of said first inner surface.

4. The cooker as in claim 2, said cooker having a substantially point source of heat, said cooking surface being supported from said receptacle member by a cooking surface support means, said cooking surface support means including indexing means for positioning said cover member on said cooker.

5. The cooker as in claim 2 and including a fixed spacing between said cooking surface and said receptacle, said spacing being adapted to provide manipulative access to said fuel.

6. The cooker as in claim 2, said cooking surface being supported from said receptacle by a cooking surface support, said cooking surface support including indexing means for positioning said cover on said cooker.

7. The cooker as in claim 1, said cooker including a cooking surface for cooking food thereon, said cooking surface being supported from said receptacle member by a cooking surface support means, said cooking surface support means including indexing means extending upwardly from said lower receptacle member for positioning said cover member on said cooker.

8. The cooker as in claim 1, said cooker including a cooking surface, said cooking surface being supported from said receptacle member by a cooking surface support means; said cooker further including a combustion grate; said cooking surface, said cooking surface support means, and said combustion grate, in combination comprising internal support members, having limited contact with said receptacle member and said cover member, each said contact being limited to substantially point contact, whereby a reduced amount of heat is lost by conduction from said internal support members to said receptacle member and said cover member, and the operating temperatures of said receptacle member and said cover member are accordingly reduced.

9. The cooker as in claim 13 and including a pan under said receptacle member, said pan being releasably latched to said receptacle member without use of separable fasteners, and supporting said receptacle member, whereby said pan provides support and stability to said cooker.

10. The cooker as in claim 9 wherein a central portion of said pan is releasably latched to said receptacle member without use of separable fasteners.

11. The cooker as in claim 10, and including a biasing spacing means between said pan and said receptacle member, said biasing spacing means circumscribing said central attachment between said receptacle member and said pan, whereby said pan is spaced from said receptacle member and wherein said central attachment portion of said pan achieves an upward bias such that said pan tends to contact an underlying support surface at locations displaced from said central attachment portion.

12. The cooker as in claim 1 and including means for concentrating the flow of air and products of combustion in a column which passes upwardly through the center of said cooker.

13. The cooker as in claim 1, the shape of said second inner surface comprising a second paraboloid.

14. The cooker as in claim 13 and including a combustion grate, places of contact between said combustion grate and said receptacle member consisting of points of contact, whereby a reduced amount of heat is lost by conduction from said combustion grate.

15. The cooker as in claim 13, said cooker including a cooking surface for cooking food thereon, said cooking surface being supported from said receptacle member by a cooking surface support means, said cooking surface support means including indexing means for positioning said cover over said cooker.

16. The cooker as in claim 13, said cooker having a combustion grate in said receptacle and a combustion air opening, communicating directly with the outside, centrally positioned below said combustion grate, and wherein air can travel directly from outside said cooker, through said opening, to said combustion grate.

17. The cooker as in claim 13, said cooker having a single substantially point source of heat.

18. The cooker as in claim 13, said first and second paraboloids being non-congruent.

19. The cooker as in claim 13 and including burner means in said receptacle, the focal locus of said second paraboloid being adjacent said burner means.

20. The cooker as in claim 19, said first and second paraboloids having a common axis.

21. The cooker as in claim 13 and including a cooking surface for cooking food thereon, the focal locus of said first paraboloid being adjacent, and above, said cooking surface.

22. The cooker as in claim 21 and including burner means in said receptacle, the focal locus of said second paraboloid being adjacent said burner means.

23. The cooker as in claim 22, said first and second paraboloids having a common axis.

24. The cooker as in claim 23, and including means for focusing both radiant and convective heat flux about the focal locus of said first paraboloid.

25. The cooker as in claim 22, said first and second paraboloids being non-congruent.

26. The cooker as in claim 13 and including a cap separably attached to said cover over at least one air outlet passage in said cover, said cap comprising a cup on one side thereof, the interior of said cup comprising a cavity and resembling the shape of a cooperatively shaped solid fuel article for use therewith, said cavity being larger in cross-section than said fuel article at the top of said cavity and conforming generally to the cross-section of said fuel article at the bottom of said cavity, whereby said cap can be used (i) to protect the top of said cover member and (ii) for containing lighter fluid being applied to said fuel article in said cavity, and directing the lighter fluid toward said fuel article.

27. The cooker as in claim 13 and including means for concentrating the flow of air and products of combustion in a column which passes upwardly through the center of said cooker.

28. The cooker as in claim 13, said cooker being readily disassembled into separate members comprising said receptacle member and said cover member, said cooker being susceptible to reassembly to enclose a smaller volume, wherein said cover member and said receptacle member are nested, one inside the other, and including securing means for securing the members of said cooker, in said reassembled configuration, against falling out of said reassembled cooker, irrespective of the attitude of said cooker.

29. The cooker as in claim 28 wherein all components of said cooker are held inside a substantially closed enclosure comprising said nest, said nest having a large opening therein, and a closing member secured over said large opening.

30. The cooker as in claim 29 wherein said first and second paraboloids are non-congruent.

31. The cooker as in claim 28 wherein said first and second paraboloids are non-congruent.

32. The cooker as in claim 13 and including a pan under said receptacle member, said pan being attached to, and supporting, said receptacle member, said cooker being capable of being disassembled, and reassembled, to enclose a smaller volume, such that said receptacle member and said cover member are nested, one inside the other, with said nest having a large opening therein, said pan being positioned over said large opening and comprising a closing member therefore.

33. A cooker as in claim 1, and including a lighter fluid application container having an internal cavity, said cavity being configured for receiving at least one shape of solid fuel article, one surface of said cavity generally conforming to the shape of one surface of said fuel article.

34. The cooker of claim 33, said container being adapted for assembly to said cover.

35. A cooker as in claim 33, said lighter fluid application container comprising a bottom and a plurality of sidewalls defining an internal cavity, said cavity having upper and lower portions, said upper and lower portions generally meeting at the midpoint of the height of said cavity, the cross-sectional area of said cavity being generally smaller in said lower portion than in said upper portion.

36. A cooker as in claim 35, said container including indicator means defining an appropriate quantity of lighter fluid to be used with said fuel article.

37. The cooker of claim 36, said container being adapted for assembly to said cover.

38. The cooker of claim 35, said container being adapted for assembly to said cover.

39. The cooker as in claim 1, said cooker having a cooking surface and a substantially point source of heat, the combination of said point source of heat, and the configurations of said receptacle member and said cover member, being adapted to apply heat, effective for cooking food at all locations on said cooking surface.

40. The cooker as in claim 39 and including means for concentrating the flow of air and products of combustion in a column which passes upwardly through the center of said cooker.

41. The cooker as in claim 40, the shape of said second inner surface comprising a second paraboloid.

42. The cooker of claim 39, comprising a cooking surface and support supported from said receptacle member, said cooking surface being spaced from said receptacle member and said cover member, places of contact, in said assembled cooker, between said support and said first and second inner surfaces consisting of points of contact.

43. The cooker of claim 39, comprising a cooking surface and support supported from said receptacle member, and indexing means for positioning said cover member on said cooker.

44. The cooker of claim 39 comprising a combustion grate in said receptacle member, places of contact between said combustion grate and said receptacle member consisting of points of contact for stability and support of said combustion grate.

45. The cooker of claim 39, comprising means for concentrating the flow of air and products of combustion in a column which passes upwardly through the center of said cooker.

46. The cooker of claim 45 wherein said second inner surface comprises a paraboloid.

47. The cooker of claim 39, comprising a pan under said receptacle member, said pan being releasably latched to said receptacle member without use of separable fasteners, and supporting said receptacle member.

48. The cooker of claim 47, a central portion of said pan having an upward bias when said pan is attached to said receptacle, whereby said pan contacts an underlying flat surface at outer portions of said pan, thereby enhancing positional stability of said cooker.

49. The cooker of claim 39, said cooker being readily disassembleable into separate members comprising said receptacle member and said cover member, said cooker being susceptible to reassembly into a storage configuration enclosing a smaller volume, wherein said cover member and said receptacle member are nested, one inside the other, and including securing means for securing the members of said cooker, in said storage configuration, against falling out of said reassembled cooker, irrespective of the attitude of said cooker.

50. The cooker of claim 49, wherein said cooker, in its storage configuration holds all components of said cooker inside a substantially closed enclosure comprising (i) said nest, said nest having a large opening therein and (ii) a closing member secured over said large opening.

51. A cooker comprising a receptacle member, a cooking surface member supported from said receptacle member, and at least one other element assembleable in said cooker, said cooking surface member and said other element being cooperatively configured, such that said cooking surface member is adapted to being resiliently deformed to thereby hold said other element.

52. The cooker of claim 51, said cooking surface member being securely assembled into said cooker such that said cooking surface member is not removed by gravity when tipped, said cooking surface member being readily disassembled from said cooker without use of tools.

53. The cooker of claim 51, said cooking surface member being supported by support means, said cooking surface member being assembled to said support means by resilient deformation of at least one of said cooking surface member and said support means.

54. The cooker of claim 51 and including a combustion grate, said combustion grate being capable of being assembled to said cooking surface member by resilient deformation of at least one of said cooking surface member and said combustion grate.

55. The cooker of claim 54, and including an upper cover member over said receptacle member, said cooker being readily disassembleable into separate members comprising said receptacle member and said cover member, said cooker being susceptible to reassembly wherein said cover member and said receptacle member are nested, one inside the other.

56. The cooker of claim 55 and including a pan under said receptacle member, said pan being separably attached to, and supporting, said receptacle member, and including a spacing means between said pan and said receptacle member, said cooker being capable of being disassembled, and reassembled, to enclose a smaller volume for storage, such that said spacing means is assembled to said cooking surface.

57. The cooker of claim 51 and including a pan under said receptacle member, said pan being separably attached to, and supporting, said receptacle member, and including a spacing means between said pan and said receptacle member, said cooker being capable of being disassembled, and reassembled, to enclose a smaller volume for storage such that said spacing means is assembled to said cooking surface.

58. The cooker of claim 57 and including an upper cover member over said receptacle member, said cooker being readily disassembleable into separate members comprising said receptacle member and said cover member, said cover member and said receptacle member being susceptible to reassembly wherein said cover member and said receptacle member are nested, one inside the other.

59. The cooker of claim 51 and including an upper cover member over said receptacle member, said cooker being readily disassembleable into separate members comprising said receptacle member and said cover member, said receptacle member and said cover member being susceptible to reassembly wherein said cover member and said receptacle member are nested, one inside the other.

60. A cooker comprising an upper cover member and a lower receptacle member, said cooker comprising a cap separably attached to said cover over at least one air outlet passage in said cover, said cap comprising a cup, the interior of said cup comprising a cavity and having a reduced cross-sectional capacity from top to bottom, the interior of said cavity resembling the shape of a cooperatively shaped fuel article and being at least as large in cross-section as said fuel article, at the bottom of said cavity, whereby said cap can be used (i) to protect the top of said cover member and (ii) for containing lighter fluid being applied to said fuel article in said cavity, and directing the lighter fluid to said fuel article.

61. The cooker of claim 60 wherein the capacity of said cup, with said fuel article therein equals approximately the amount of lighter fluid to be applied to said fuel article.

62. The cooker of claim 60 wherein the bottom portion of said cavity has raised portions for holding said fuel article off the bottom of said cavity.

63. The cooker of claim 60, said cup including means for measuring the appropriate amount of lighter fluid to be applied to said fuel article.

64. The cooker of claim 63 wherein said measuring means comprises a capacity mark to indicate an appropriate quantity of lighter fluid to be applied to said fuel article when said article is in said cup.

65. A cooker comprising an upper cover member and a lower receptacle member, said cooker comprising a combustion grate for holding solid fuel in said receptacle member, a primary air inlet passage in said receptacle member vertically below said combustion grate, and a direct path for unimpeded vertical flow of air between said primary air inlet passage and said combustion grate, and a plurality of secondary air inlet passages about the periphery of said primary air inlet passage, each said secondary air inlet passage being substantially smaller than said primary air inlet passage.

66. The cooker of claim 65 comprising additionally a fuel article on said combustion grate, said fuel article having a vertical hole therethrough, said hole being positioned substantially vertically over said primary air inlet passage.

67. The cooker of claim 65 and including an air outlet passage in said cover member, said primary air inlet passage and said air outlet passage being substantially aligned with said combustion grate when said grate is installed in said cooker in its normal use position.

68. The cooker of claim 67, said cooker including means for concentrating the flow of air and products of combustion in a column passing upwardly through the center of said cooker.

69. The cooker of claim 67, said cooker further comprising a pan under said receptacle member, said pan being releasably latched to said receptacle member without use of tools, and supporting said receptacle member, and including appropriate spacing between said pan and said receptacle member for unimpeded flow of air to said air inlet passage.

70. The cooker of claim 69 and including, in combination, a single solid fuel article on said combustion grate as a source of heat, said fuel article having a hole therein aligned with said air inlet passage and said air outlet passage.

71. The cooker of claim 65 and including an air outlet passage in said cover member, said primary air inlet passage and said air outlet passage being substantially aligned with said combustion grate when said grate is installed in said cooker in its normal use position, whereby air and combustion gases can pass through said cooker in a primary air column, air entering said cooker through said secondary air passages tending to stabilize the edges of said air column whereby turbulence outside said air column is reduced.

72. A generally closed cooker, comprising:
(a) a lower receptacle member having upstanding walls and a top;
(b) an upper cover member over said receptacle member;
(c) a cooking surface supported from said receptacle member, said cooking surface being vertically spaced above said top of said receptacle member; and
(d) a supporting and stabilizing pan under said receptacle member, said pan being attached to, and supporting, said receptacle member.

73. The generally closed cooker of claim 72, a central portion of said pan having an upward bias when said pan is attached to said receptacle, whereby said pan contacts an underlying flat surface at outer portions of said pan, thereby enhancing the positional stability of said cooker.

74. The generally closed cooker of claim 72 wherein a central portion of said pan is attached to said receptacle member, and including a biasing spacing means between said pan and said receptacle member, said biasing spacing means circumscribing said central attachment between said receptacle member and said pan.

75. A cooker comprising a lower receptacle member and a cooking surface supported from said receptacle member by support means, said cooking surface being securely assembled into said cooker such that said cooking surface is not removed by gravity when tipped, said cooking surface being assembled to said support means by resilient deformation of at least one of said cooking surface and said support means.

76. The cooker of claim 75 and including a combustion grate, said combustion grate being capable of being assembled to said cooking surface by resilient deformation of at least one of said cooking surface and said combustion grate.

77. The cooker of claim 75 and including a pan under said receptacle member, said pan being attached to, and supporting, said receptacle member.

78. A generally closed cooker, comprising:
(a) a cover member;
(b) a lower receptacle member having upstanding walls and a top;
(c) a cooking surface, for receiving food thereon, supported from said receptacle member; and
(d) combustion means under said cooking surface, said cooking surface being spaced from said receptacle member and said cover member.

79. A generally closed cooker, comprising:
(a) a cover member;
(b) a lower receptacle member having upstanding walls and a top;
(c) a cooking surface, for receiving food thereon, supported from said receptacle member; and
(d) combustion means under said cooking surface, places of contact between said cooking surface and its support means, and said first and second inner surfaces consisting essentially of points of contact, such that paths of thermal conductivity between said cooking surface and its support means, and said inner surfaces are restricted, whereby a reduced amount of heat is conductively transferred to said inner surface from said cooking surface and its support means.

80. A generally closed cooker, comprising:
(a) a cover member;
(b) a lower receptacle member having upstanding walls and a top;
(c) a cooking surface, for receiving food thereon, supported from said receptacle member; and
(d) combustion means under said cooking surface, said cooking surface being securely assembled into said cooker such that said cooking surface is not removed by gravity when tipped, and being readily disassembleable from said cooker without use of tools.

81. A generally closed cooker, comprising:
(a) a cover member;
(b) a lower receptacle member having upstanding walls and a top;
(c) a cooking surface, for receiving food thereon, supported from said receptacle member; and
(d) combustion means under said cooking surface, said cooker being readily disassembleable into separate members comprising said receptacle member and said cover member, said receptacle member and said cover member being susceptible to reassembly wherein said receptacle member and said cover member are nested, one inside the other.

82. A generally closed cooker, comprising:
(a) a cover member;
(b) a lower receptacle member having upstanding walls and a top;
(c) a cooking surface, for receiving food thereon, supported from said receptacle member;
(d) combustion means under said cooking surface; and
(e) a pan under said receptacle member, said pan being latched to, and supporting said receptacle member, said cooker being adapted to being disassembled, and reassembled to enclose a smaller volume for storage such that said receptacle member and said cover member are nested one inside the other, with said nest having a large opening therein, said pan being positioned over said large opening and comprising a closing member therefore.

83. A generally closed cooker, comprising:
(a) a lower receptacle member having upstanding walls and a top;

(b) an upper cover member over said receptacle member;

(c) a cooking surface supported from said receptacle member, said cooking surface being above said top of said receptacle member; and (d) indexing means on the combustion of said cooking surface and support for positioning said cover member on said cooker.

84. A generally closed cooker, comprising:

(a) a lower receptacle member having upstanding walls and a top;

(b) an upper cover member over said receptacle member;

(c) a cooking surface supported from said receptacle member, said cooking surface being above said top of said receptacle member; and (d) a combustion grate, said combustion grate being capable of being assembled to said cooking surface by resilient deformation of at least one of said cooking surface and said combustion grate.

85. A generally closed cooker, comprising:

(a) a lower receptacle member having upstanding walls and a top;

(b) an upper cover member over said receptacle member;

(c) a cooking surface supported from said receptacle member, said cooking surface being above said top of said receptacle member; and (d) a supporting and stabilizing pan under said receptacle member, said pan being separably attached to, and supporting, said receptacle member, and including a biasing spacing means between said pan and said receptacle member, said cooker being capable of being disassembled and reassembled, to enclosed a smaller volume, for storage such that said spacing means is assembled to said cooking surface.

86. A cooker comprising an upper cover member having a first inner surface, a lower receptacle member having a second inner surface and upstanding wall portions, and a cooking surface depending from one of said upper cover member and said lower receptacle member, said cooker having a single heat source, for cooking food, in said receptacle, each cross-sectional dimension of said heat source being small as compared to the width across said receptacle member between said upstanding wall portions at the lower of said heat source, the combination of said single heat source, said receptacle member, and said cover member being adapted to apply heat, effective for cooking food at all locations on said cooking surface.

87. The cooker as in claim 86 wherein said first and second inner surfaces comprise paraboloids.

88. The cooker as in claim 86 and including a cooking surface, capable of receiving food thereon, and a cooking surface support supported from said receptacle member, and combustion means under said cooking surface for receiving a solid fuel article, said cooking surface being vertically spaced a fixed distance above said receptacle member, thereby creating a spacing between said receptacle member and said cooking surface and support, the general distance across said spacing comprising at least six percent of the distance across said receptacle member, at the top thereof, and between said upstanding wall portions at the top of said receptacle member.

89. The cooker as in claim 86 and including a cooking surface and support supported from said receptacle member, said cooking surface being spaced from said receptacle member and said cover member, said support having minimal contact, comprising point contacts, with said receptacle.

90. The cooker as in claim 86, said cooker including a cooking surface paths of thermal conductivity between said cooking surface and said inner surfaces being minimized, whereby a reduced amount of heat is conductively transferred to said cover member and said receptacle member from said cooking surface.

91. The cooker as in claim 86 and including a cooking surface and support separably attached to said receptacle member such that said cooking surface and support is not detached by gravity, even when said cooker is tipped, said cooking surface and support being readily disassembleable from said cooker without use of tools.

92. The cooker as in claim 86, said cooker, when assembled for cooking, including a cooking surface and support supported from said receptacle member, places of contact in said assembled cooker between (i) said cooking surface and support and (ii) said first and second inner surfaces consisting of points of contact, such that paths of thermal conductivity between (i) said cooking surface and support and (ii) said first and second inner surfaces are minimized, whereby a reduced amount of heat is conductively transferred to said cover member and said receptacle member from said cooking surface and support.

93. The cooker as in claim 86, including a cooking surface and support supported from said receptacle member, and indexing means, on said combination of cooking surface and support, for positioning said cover member on said cooker.

94. The cooker as in claim 86 and including a combustion grate in said receptacle member, places of contact between said combustion grate and said receptacle member consisting of point contacts.

95. The cooker as in claim 86 and including means for concentrating the flow of air and products of combustion into a column which passes upwardly through the center of said cooker.

96. The cooker as in claim 86 and including a cap separably attached to said cover over at least one air outlet passage in said cover, said cap comprising a cup on one side thereof, the interior of said cup comprising a cavity and having a reduced cross-sectional capacity, from top to bottom, said cavity resembling the shape of a cooperatively shaped solid fuel article for use therewith, and being at least as large in cross-sectional capacity as said fuel article, at the bottom of said cavity, whereby said cap can be used (i) to protect the top of said cover member and (ii) for containing lighter fluid being applied to said fuel article in said cavity, and directing the lighter fluid toward said fuel article.

97. The cooker as in claim 86, said cooker being readily disassembleable into separate members comprising said receptacle member and said cover member, said cooker being susceptible to reassembly wherein said cover member and said receptacle member are nested, one inside the other.

98. The cooker as in claim 97 wherein all components of said cooker are held inside a substantially closed enclosure comprising said nest, said nest having a large opening therein and a closing member secured over said large opening.

99. A generally closed cooker having a plurality of walls comprising an enclosure and including a cooking surface supported from said walls by a support means and wherein contact between said walls and the combination of said cooking surface and said support means is limited to contact points for stability and support of said cooking surface and said support means, whereby the amount of heat conducted from said cooking surface and support means is minimized by said limited contact, and the operating temperature of said walls is reduced.

100. The generally closed cooker as in claim 99 wherein said cooking surface is spaced from said walls.

101. A generally closed cooker as in claim 99, said enclosure comprising (i) a cover member having a first inner surface, (ii) a lower receptacle member having a second inner surface and a top, and (iii) combustion means under said cooking surface, said cooking surface being supported from said receptacle member and being located a fixed distance above the top of said receptacle member.

102. The generally closed cooker as in claim 99, said cooking surface being securely assembled into said cooker such that said cooking surface is not removed by gravity when tipped, and is readily disassembleable from said cooker without use of tools.

103. The generally closed cooker as in claim 99, said enclosure comprising a lower receptacle member and an upper cover member, and including indexing means on the combination of said cooking surface and support means for positioning said cover member on said cooker.

104. The generally closed cooker as in claim 99, and including a combustion grate in said cooker, places of contact between said combustion grate and said cooker consisting of points of contact for stability and support of said combustion grate.

105. The generally closed cooker as in claim 99, said enclosure comprising a lower receptacle member and an upper cover member, said cooker further comprising a pan under said receptacle member, said pan being attached to, and supporting, said receptacle member, said cooker being capable of being disassembled, and reassembled to obtain a smaller volume for storage such that said receptacle member and said cover are nested, one inside the other, with said nest having a large opening and said pan being positioned over said large opening and comprising a closing member therefore.

106. A cooker comprising a receptacle member and a cooking surface including means for supporting said cooking surface from said receptacle member, said cooking surface being assembled in said cooker with resilient deformation of said cooking surface.

107. A generally closed cooker having a plurality of walls comprising an enclosure, a cooking surface supported from said enclosure, and a combustion grate in said cooker, enclosure places of contact between said combustion grate and said cooker consisting essentially of points of contact for stability and support of said combustion grate, whereby the amount of heat conducted from said combustion grate is minimized by said limited contact, and the operating temperature of said walls is reduced.

108. The generally closed cooker of claim 107, said combustion grate being capable of being assembled to said cooking surface by resilient deformation of at least one of said cooking surface and said combustion grate.

109. A cooker, comprising:
(a) a receptacle member;
(b) a cooking surface supported from said receptacle member; and
(c) a combustion grate, said combustion grate being capable of being assembled to said cooking surface by resilient deformation of at least one of said cooking surface and said combustion grate.

110. The cooker of claim 109 and including a stabilizing pan under said receptacle member, and including a spacing means between said pan and said receptacle member, said spacing means being capable of being disassembled from said cooker and being assembled to said cooking surface.

111. The cooker of claim 110 wherein said cooker includes a cover member, said cooker being readily disassembleable into separate members, said receptacle member and said cover member being susceptible to reassembly wherein said cover member and said receptacle member are nested, one inside the other.

112. The cooker of claim 109 wherein said cooker includes a cover member, said cooker being readily disassembleable into separate members, said receptacle member and said cover member being susceptible to reassembly wherein said cover member and said receptacle member are nested, one inside the other.

113. A cooker, comprising:
(a) a lower receptacle member and an upper cover member, the combination of said lower receptacle member and said upper cover member comprising an enclosure;
(b) a cooking surface supported by support means from said receptacle; and
(c) indexing means on the combination of said cooking surface and support,
said support means extending internally of said enclosure, upwardly from said receptacle, said indexing means being adapted to positioning said cover member with respect to said receptacle member.

114. The cooker of claim 113, said cooker being readily disassembleable into separate members comprising said receptacle member, said cover member and said supported cooking surface member, said members being susceptible to reassembly for storage wherein said receptacle member and said cover member are nested, one inside the other, and said cooking surface and support is securely held into said cooker when said cooker is reassembled for storage.

115. The cooker of claim 114 wherein, in said storage assembly configuration, the volume of said cooker is reduced by at least about 50%.

116. A cooker, comprising:
(a) a receptacle member,
(b) a cooking surface defining a cooking locus; and
(c) a pan under said receptacle member, said pan being releasably secured to said receptacle member without use of separable fasteners, said pan supporting said receptacle member.

117. The cooker of claim 116, a central portion of said pan having an upward bias when said pan is attached to said receptacle, whereby said pan contacts an underlying flat surface at outer portions of said pan, thereby enhancing the positional stability of said cooker.

118. The cooker of claim 117, a central portion of said pan being attached to said receptacle member.

119. The cooker of claim 118 and including a biasing spacing means biasing said pan from said receptacle member.

120. The cooker of claim 117 and including a biasing spacing means biasing said pan from said receptacle member.

121. The cooker of claim 117, and including means for latching said pan to said receptacle member without use of tools.

122. The cooker of claim 116, a central portion of said pan being so secured to said receptacle member.

123. The cooker of claim 122 and including a biasing spacing means biasing said pan from said receptacle.

124. The cooker of claim 122, and including means, integral with one of said pan and said receptacle member, for securing said pan to said receptacle member without use of tools.

125. The cooker of claim 122 and including latch means in said pan for attaching said pan to said receptacle.

126. The cooker of claim 122, said cooker including a cover member, said cooker being readily disassembleable into separate members, said receptacle member and said cover member being susceptible to reassembly wherein said cover member and said receptacle member are nested, one inside the other.

127. A cooker as in claim 116, said pan being releasable from said receptacle by manipulation of at least one of said pan and said receptacle member.

128. The cooker of claim 116 said pan being releasably secured to said receptacle member by attachment means, said attachment means comprising latch means in said pan for attaching said pan to said receptacle member.

129. The cooker of claim 116 and including latch means in said pan for attaching said pan to said receptacle.

130. The cooker of claim 129, said cooking locus comprising cooking surface and support member, said cooker comprising a cover member, said cooker being readily disassembleable into separate members comprising said receptacle member, said cover member and said cooking surface and support member, said members being susceptible to reassembly for storage wherein said receptacle member and said cover member are nested, one inside the other, and said cooking surface and support is securely held into said cooker when said cooker is reassembled for storage.

131. The cooker as in claim 1, said cooker having a substantially point source of heat.

132. A cooker, comprising:
(a) a receptacle member;
(b) a pan under said receptacle member, said pan being secured to, and supporting, said receptacle member; and
(c) a biasing spacing means biasing said pan from said receptacle.

133. The cooker of claim 132 and including latch means in said pan for attaching said pan to said receptacle.

134. The cooker of claim 132 and including a cooking surface defining a cooking locus, said cooking locus comprising cooking surface and support member, said cooker comprising a cover member being readily disassembleable into separate members comprising said receptacle member, said cover member and said cooking surface and support member, said members being susceptible to reassembly for storage wherein said receptacle member and said cover member are nested, one inside the other, and said cooking surface and support is securely held inside said cooker when said cooker is reassembled for storage.

135. The cooker of claim 132 and including a cooking surface defining a cooking locus, and wherein said cooking locus comprises a cooking grate, and including means for releasably attaching said biasing means to said cooking grate.

136. The cooker of claim 135, said biasing means having legs, said attaching means comprising frictional engagement between said legs and said cooking grate.

137. The cooker of claim 132, including means for attaching said pan to said receptacle without use of separable fasteners.

138. A cooker, comprising an upper cover member and a lower receptacle member, said cooker being readily disassembleable into separate members comprising said cover member and said receptacle member, said cooker being susceptible to reassembly to enclose a smaller volume, wherein said receptacle member and said cover member are nested, one inside the other in a reassembled configuration, and including securing means on said cooker for securing the members of said cooker, in said reassembled configuration, wherein, in said reassembly, all pieces of said cooker are secured to said cooker by one or more securing means, and wherein said one or more securing means is an integrate part of said cooker, and having a separate function in the cooking configuration.

139. A cooker, comprising an upper cover member and a lower receptacle member, said cooker being readily disassembleable into separate members comprising said cover member and said receptacle member, said cooker being susceptible to reassembly to enclose a smaller volume, wherein said receptacle member and said cover member are nested, one inside the other in a reassembled configuration, and including securing means on said cooker for securing the members of said cooker, in said reassembled configuration, and wherein, in said reassembly, said nest has an opening therein and a closing member securable over said opening.

140. A cooker as in claim 138, or 139 wherein, in said reassembly, the volume of said cooker is reduced by up to about 50% as compared to said assembled cooking configuration of said cooker.

141. The cooker of claim 140 and including joining means on said closing member, said joining means being configured for separably joining said closing member to said nest in said reassembly to thereby hold said reassembly in a closed storage configuration, said joining means being a first joining means, and including a second joining means on one of said cover member and said receptacle member, said first and second joining means being cooperatively configured for being separably joining together in said reassembly.

142. The cooker of claim 141, said second securing means being on the outer one of said cover means and said receptacle member, as determined in said reassembled and closed configuration.

* * * * *